(12) United States Patent
Lyren

(10) Patent No.: US 11,087,550 B2
(45) Date of Patent: Aug. 10, 2021

(54) WEARABLE ELECTRONIC GLASSES WITH EYE TRACKING

(71) Applicant: Philip Scott Lyren, Hong Kong (CN)

(72) Inventor: Philip Scott Lyren, Hong Kong (CN)

(*) Notice: Subject to any disclaimer, the term of this patent is extended or adjusted under 35 U.S.C. 154(b) by 51 days.

(21) Appl. No.: 16/679,260

(22) Filed: Nov. 10, 2019

(65) Prior Publication Data

US 2020/0074745 A1 Mar. 5, 2020

Related U.S. Application Data

(63) Continuation of application No. 15/423,567, filed on Feb. 2, 2017, which is a continuation of application No. 15/017,587, filed on Feb. 6, 2016, now Pat. No. 9,569,899, which is a continuation of application No. 14/044,091, filed on Oct. 2, 2013, now Pat. No. 9,256,072.

(51) Int. Cl.
| | |
|---|---|
| *G06T 19/00* | (2011.01) |
| *G02B 27/01* | (2006.01) |
| *G06F 40/51* | (2020.01) |
| *G02B 27/00* | (2006.01) |
| *G06F 1/16* | (2006.01) |
| *G06F 3/01* | (2006.01) |

(52) U.S. Cl.
CPC ........ *G06T 19/006* (2013.01); *G02B 27/0093* (2013.01); *G02B 27/017* (2013.01); *G02B 27/0172* (2013.01); *G06F 1/163* (2013.01); *G06F 3/012* (2013.01); *G06F 40/51* (2020.01); *G02B 2027/014* (2013.01); *G02B 2027/0138* (2013.01); *G02B 2027/0141* (2013.01); *G02B 2027/0178* (2013.01)

(58) Field of Classification Search
CPC ....... G06T 19/006; G06F 40/51; G06F 1/163; G06F 3/012; G02B 27/0093; G02B 27/0172; G02B 27/017; G02B 2027/014; G02B 2027/0178; G02B 2027/0141; G02B 2027/0138
See application file for complete search history.

(56) References Cited

U.S. PATENT DOCUMENTS

| | | | | |
|---|---|---|---|---|
| 8,914,472 B1* | 12/2014 | Lee | ........................ | G06T 19/006 709/219 |
| 2013/0009863 A1* | 1/2013 | Noda | ...................... | G06F 3/013 345/156 |

* cited by examiner

*Primary Examiner* — Amit Chatly

(57) ABSTRACT

Wearable electronic glasses (WEG) include an eye tracker that tracks a direction of gaze of a user wearing the WEG. A display displays three-dimensional (3D) augmented reality (AR) instructions how to operate an electronic device in response to detecting the direction of gaze of the user is at the electronic device that is visible through the display of the WEG.

18 Claims, 19 Drawing Sheets

```
┌─────────────────────────────────────────────────────────────┐
│ Display, through and/or with a wearable electronic device,   │
│                a virtual object with a real object.          │
│                            600                                │
└─────────────────────────────────────────────────────────────┘
                              │
                              ▼
┌─────────────────────────────────────────────────────────────┐
│ Move, in response to movement of the wearable electronic     │
│ device and/or the real object, the virtual object from being │
│ at one location with respect to the real object to being at  │
│         another location with respect to the real object.   │
│                            610                                │
└─────────────────────────────────────────────────────────────┘
```

Figure 6

```
┌─────────────────────────────────────────────────────────────┐
│ Provide or capture, with a wearable electronic device, a     │
│                real location with real objects.              │
│                            700                                │
└─────────────────────────────────────────────────────────────┘
                              │
                              ▼
┌─────────────────────────────────────────────────────────────┐
│ Display, on a display of an electronic device, a virtual     │
│ location with virtual objects that emulate the real location │
│                      with the real objects.                  │
│                            710                                │
└─────────────────────────────────────────────────────────────┘
                              │
                              ▼
┌─────────────────────────────────────────────────────────────┐
│ Receive, at the electronic device, actions to one or more    │
│          of the virtual objects at the virtual location.     │
│                            720                                │
└─────────────────────────────────────────────────────────────┘
                              │
                              ▼
┌─────────────────────────────────────────────────────────────┐
│ Display, through and/or with a display of the wearable       │
│ electronic device, the actions such that the actions to the  │
│ one or more virtual objects at the virtual location are      │
│     reproduced with respect to the real objects at the real  │
│                            location.                         │
│                            730                                │
└─────────────────────────────────────────────────────────────┘
```

Figure 7

WEARABLE ELECTRONIC GLASSES WITH EYE TRACKING

BACKGROUND

Electronic devices can provide users with digital content that enhances a view of the real world. These enhancements include virtual images that provide users with visual information. For example, augmented reality uses computer-generated elements to supplement a perception of the physical world that viewers perceive.

BRIEF DESCRIPTION OF THE DRAWINGS

FIG. 6 is a method to move a location of a virtual object in response to movement of a wearable electronic device and/or a real object in accordance with an example embodiment.

FIG. 7 is a method to display, with and/or through a wearable electronic device, actions to virtual objects received from an electronic device in accordance with an example embodiment.

SUMMARY OF THE INVENTION

One example embodiment is a method that detects a real object with a wearable electronic device and displays a virtual image of the real object with the real object on a display of the wearable electronic device. The wearable electronic device displays movement of the virtual image of the real object to show a task to be completed and detects a completion of the task.

DETAILED DESCRIPTION

Example embodiments include systems, apparatus, and methods that include electronic devices that utilize digital content to supplement a view of the real world. This content includes digital images, virtual images, computer-mediated reality, augmented reality, virtual reality, and other technologies that supplement or alter the view of the real world.

Figure 1:
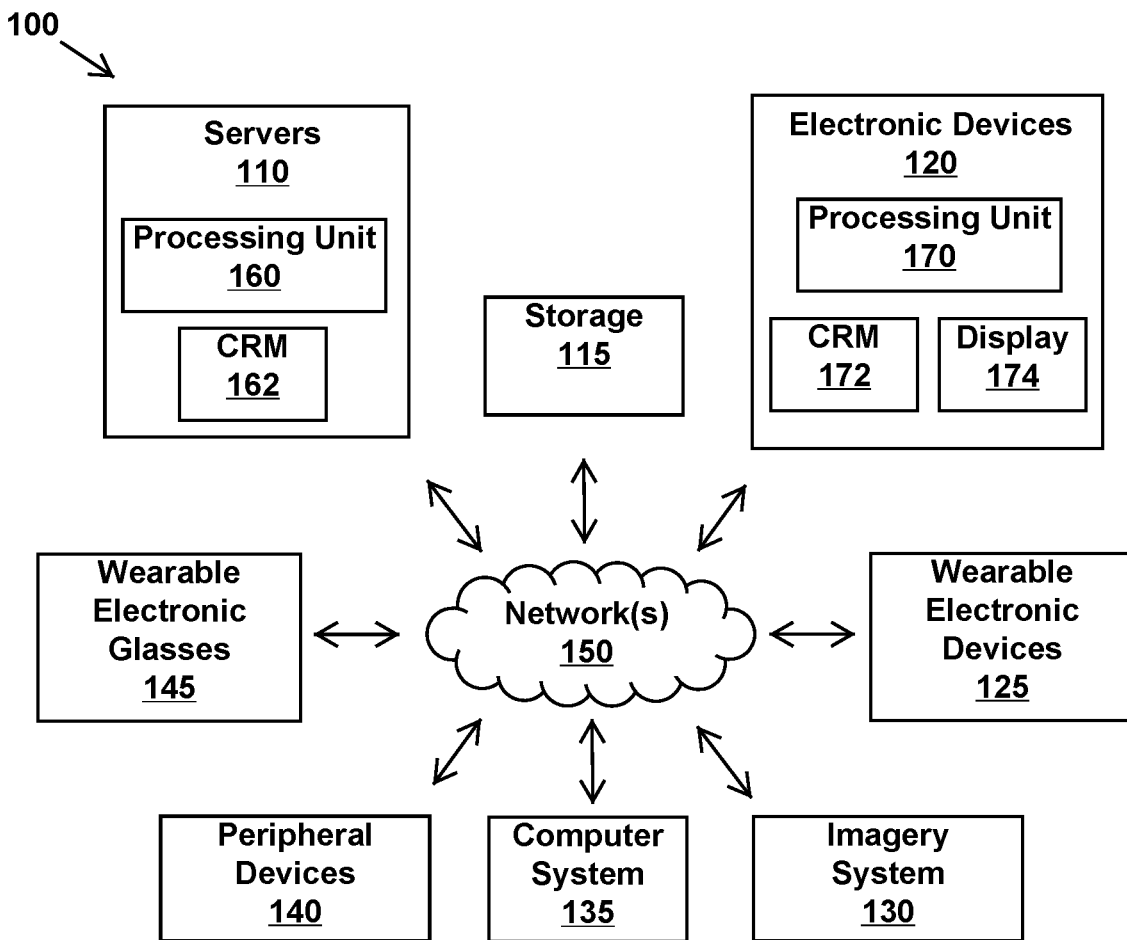
FIG. 1 is a computer system in accordance with an example embodiment.

FIG. 1 is a computer system 100 in accordance with an example embodiment. The computer system includes servers 110, storage 115, electronic devices 120, wearable electronic devices 125, an imagery system 130, a computer system 135 (such as the computer system 2200 shown in FIG. 22 or components therein), peripheral devices 140, and wearable electronic glasses 145 in communication with each other through one or more networks 150. Blocks and methods discussed herein execute with the computer system or one or more of the electronic devices, servers, and/or components therein.

The servers 110 include one or more of a processor unit 160 with one or more processors and computer readable medium 162 (CRM), such as random access memory and/or read only memory. The electronic devices 120 include one or more of a processor unit 170, CRM 172, and a display 174. The processing unit communicates with the CRM to execute operations and tasks that implement or assist in implementing example embodiments.

By way of example, the electronic devices include, but are not limited to, handheld portable electronic devices (HPEDs), wearable electronic devices, wearable electronic glasses, portable electronic devices, computing devices, electronic devices with cellular or mobile phone capabilities, digital cameras, desktop computers, servers, portable computers (such as tablet and notebook computers), handheld audio playing devices (example, handheld devices for downloading and playing music and videos), personal digital assistants (PDAs), combinations of these devices, devices with a processor or processing unit and a memory, and other portable and non-portable electronic devices and systems.

By way of example, the networks 150 include one or more of the internet, an intranet, an extranet, a cellular network, a local area network (LAN), a home area network (HAN), metropolitan area network (MAN), a wide area network (WAN), public and private networks, etc.

By way of example, the storage 115 can include various types of storage that include, but are not limited to magnetic storage and optical storage, such as hard disks, magnetic tape, disk cartridges, universal serial bus (USB) flash memory, compact disk read-only memory (CD-ROM), digital video disk read-only memory (DVD-ROM), CD-recordable memory, CD-rewritable memory, photoCD, and web-based storage. Storage can include storage pools that are hosted by third parties, such as an operator of a data center. The electronic devices, servers, and/or other components can use the storage to store files, software applications, data objects, etc. Storage can be accessed through a web service application programming interface, a web-based user interface, or other mechanisms.

Figure 2:
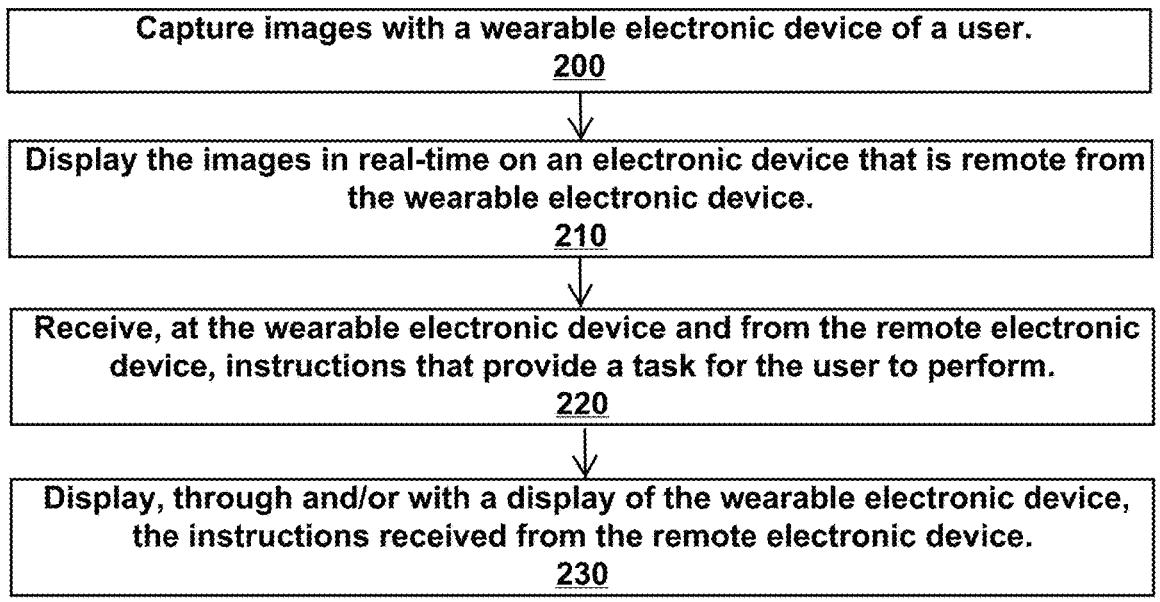
FIG. 2 is a method to provide instructions from an electronic device to a wearable electronic device in accordance with an example embodiment.

FIG. 2 is a method to provide instructions from an electronic device to a wearable electronic device.

Block 200 states capture images with a wearable electronic device of a user.

By way of example, two-dimensional (2D) and/or three-dimensional (3D) images are captured with an optical device of a wearable electronic device, such as with a camera or lens. The images can be recorded, stored in memory, displayed, transmitted, and/or provided to a user. For instance, video images and audio are captured with the wearable electronic device and then wirelessly transmitted over a network.

Block 210 states display the images in real-time on an electronic device that is remote from the wearable electronic device.

The remote electronic device receives the captured images from the wearable electronic device and displays or projects these images. For instance, the images are displayed on or through a display or presented as a three dimensional image, such as a volumetric display device, 3D display, or 3D projection. The electronic device and the wearable electronic device can be physically remote from each other, such as being in different cities or states, being at different locations in a building, being in different rooms, etc.

Block 220 states receive, at the wearable electronic device and from the remote electronic device, instructions that provide a task for the user to perform.

The remote electronic device receives instructions from a user and/or an electronic device. For instance, a user interacts with a user interface (UI) or graphical user interface (GUI) to provide commands and/or instructions that are transmitted to or provided to the wearable electronic device. These commands and/or instructions provide a task for the user or wearer of the wearable electronic device to perform.

Block 230 states display, through and/or with a display of the wearable electronic device, the instructions received from the electronic device.

The wearable electronic device receives the instructions from the remote electronic and then displays, stores, or provides these instructions. For instance, the instructions are displayed or provided to a wearer of the wearable electronic device.

Consider an example in which a person wears a pair of wearable electronic glasses (such as GOOGLE glass). These glasses capture video images of a field of view of the user and transmit the video images to a handheld portable electronic device (HPED) that is remotely located from the glasses. The video images appear on a display of the HPED so a user of the HPED can view what the person sees through the glasses. The user interacts with the HPED and provides instructions or information to the person wearing the glasses. By way of example, the instructions include one or more of voice commands, text commands, images, or interactions with controls. These instructions transmit to the wearable electronic glasses so the person wearing these glasses can view or receive the instructions. For example, the instructions include images in augmented reality or virtual reality that the wearer of the glasses views.

Consider an example in which a person located in the state of Ohio wears a pair of wearable electronic glasses that transmits images in real-time from the wearable electronic glasses to a personal computer of another person located in the state of California. The personal computer captures or assists in capturing 3D images of the person located in California and then transmits these images to the wearable electronic glasses such that the 3D images appear through the glasses to the person located in Ohio. These 3D images include information or actions that instruct the person located in Ohio how to proceed, act, or move.

Figure 3:
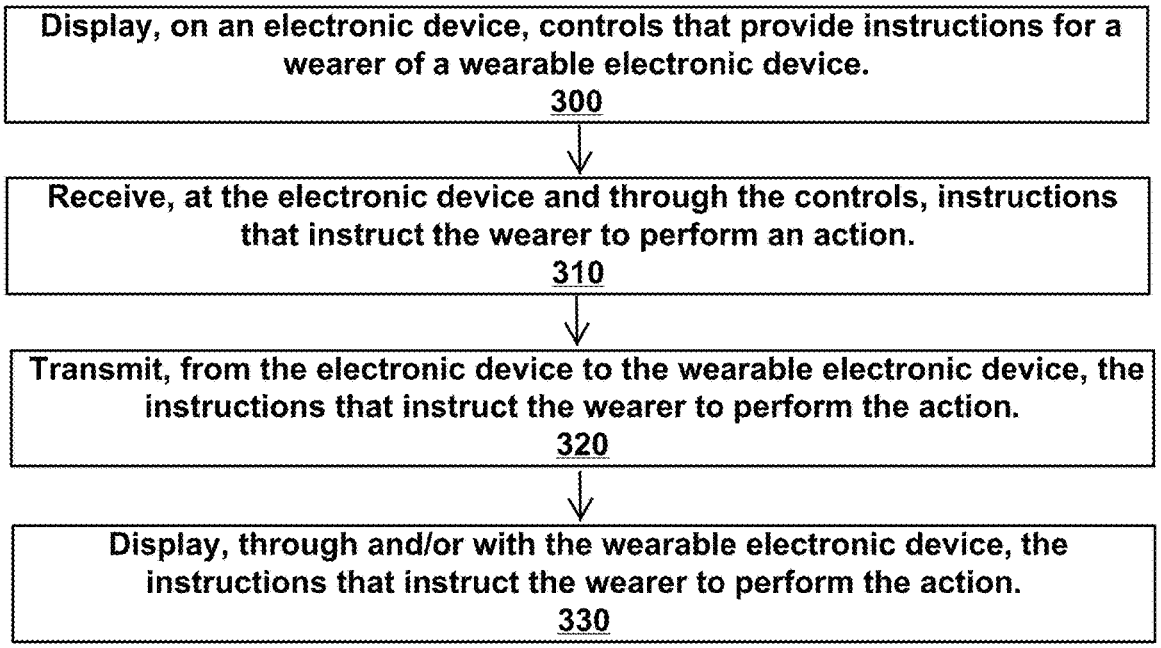
FIG. 3 is a method to display instructions through a wearable electronic device to instruct a wearer of the wearable electronic device to perform an action in accordance with an example embodiment.

FIG. 3 is a method to display instructions through a wearable electronic device to instruct a wearer of the wearable electronic device to perform an action.

Block 300 states display, on an electronic device, controls that provide instructions for a wearer of a wearable electronic device.

The electronic device includes a display with controls that enable a user of the electronic device to provide or generate instructions for the wearer of the wearable electronic device. For example, the controls appear on or are generated by the display of the electronic device and/or on the electronic device.

For instance, a user interacts with a user interface on the electronic device to create instructions, commands, and/or actions for the wearer of the wearable electronic device. The electronic device and the wearable electronic device can be physically remote from each other, such as being in different cities or states, being at different locations in a building, being in different rooms, etc.

Block 310 states receive, at the electronic device and through the controls, instructions that instruct the wearer of the wearable electronic device to perform an action.

The electronic device receives or generates the instructions that instruct the wearer of the wearable electronic device. For instance, a user of a remote electronic device interacts with its display or a user interface to generate the instructions. As another example, the electronic device includes one or more sensors that sense an action of the user and generates from the sensed action instruction for the wearer of the wearable electronic device.

Block 320 states transmit, from the electronic device to the wearable electronic device, the instructions that instruct the wearer of the wearable electronic device to perform the action.

By way of example, the instructions are transmitted over one or more networks from the remote electronic device to the wearable electronic device. The instructions can be stored in memory and then provided to the wearable electronic device.

Block 330 state display, through and/or with the wearable electronic device, the instructions that instruct the wearer of the wearable electronic device to perform the action.

The wearable electronic device receives the instructions and then provides or displays these instructions to the wearer of the wearable electronic device. For instance, the instructions are projected by or displayed through a glass, camera, or lens of the wearable electronic device or another electronic device. These instructions are visible to the wearer of the wearable electronic device.

Consider an example in which a wearer wears a wearable electronic device that captures video and transmits this video to a display of a tablet computer. A user of the tablet computer is thus able to see what the wearer of the wearable electronic device sees since a field of vision of the wearer is captured with the wearable electronic device and transmitted to the tablet computer. The display of the tablet computer also includes controls (such as GUI controls) that enable the user of the tablet computer to generate instructions or commands. These instructions are transmitted back to the wearable electronic device and provided to the wearer. The wearer views the instructions through a lens of the wearable electronic device and acts according to the information provided from the user of the tablet computer. For example, the wearer follows the instructions viewed with the wearable electronic device.

Consider an example in which a remote electronic device includes a 3D motion control system or gesture controlled system that receives commands from a user. The user performs gestures with his hands and arms to generate commands and/or instructions. These commands are transmitted to and displayed to a wearable electronic device as instructions or information to the wearer of the wearable electronic device. The commands from the user are replicated at the wearable electronic device. For instance, hand and/or body movements of the user of the remote electronic device are recorded and then displayed as 3D images or virtual images to the wearer of the wearable electronic device. Alternatively, the hand and/or body movements of the user function as instructions or commands that are transmitted to or relayed to the wearable electronic device. For example, a hand gesture in one direction and with a certain motion signifies to the wearer of the wearable electronic device to walk in a particular direction. A hand gesture in another direction and with another motion signifies to the wearer of the wearable electronic device to stop and sit down. These gestures can appear as virtual hand gestures, the actual hand gestures, or in another form, such as text instructions, audio instructions, or instructions that use icons, symbols, or graphics.

Consider an example in which a first user at a first geographical location wears a first pair of wearable electronic glasses, and a second user at a second geographical location wears a second pair of wearable electronic glasses. A field of vision of the second user transmits to the first user such that the first user sees through the first wearable electronic glasses images at the second geographical location that the second user sees. The first user makes hand gestures into his field of vision being generated at the first wearable electronic glasses. These hand gestures transmit to the second user and appear as virtual 3D images in the field of view of the second user at the second geographical location. The second user then emulates or copies these virtual 3D hand gestures with real hand movements from his own hands. For instance, the hand gestures instructed or showed the second user to pick up an item located at the second geographical location. The second user emulates the received hand gestures with his own hands or interprets the hand gestures to signify an action to take.

A user at the remote electronic device is able to control mental and/or physical actions of the wearer of the wearable electronic device. The user at the remote electronic device generates or produces commands or instructions for mental and/or physical actions, and these commands or instructions are provided to the wearer of the wearable electronic device. The user is thus able to control or instruct the wearer how to act. These mental and/or physical actions include, but are not limited to, thinking, calculating, envisioning, dreaming, walking, running, standing, sitting, moving in a particular direction, moving at a certain speed, holding an object, throwing an object, speaking, moving a particular body part (such as rotating a head or moving an arm or hand), jumping, grasping or retrieving an object, releasing an object, or performing other physical or mental actions that humans are capable of performing.

Consider an example in which an electronic device communicates with a head-mounted display in an augmented reality system. A user of the electronic device provides instructions that instruct a wearer of the head-mounted display how to act or move. By way of example, these instructions inform the wearer to walk in a particular direction, follow another individual, and perform a series of work-related tasks. The instructions are displayed to the wearer as virtual images that augment a real-world view of the wearer.

Figure 4:
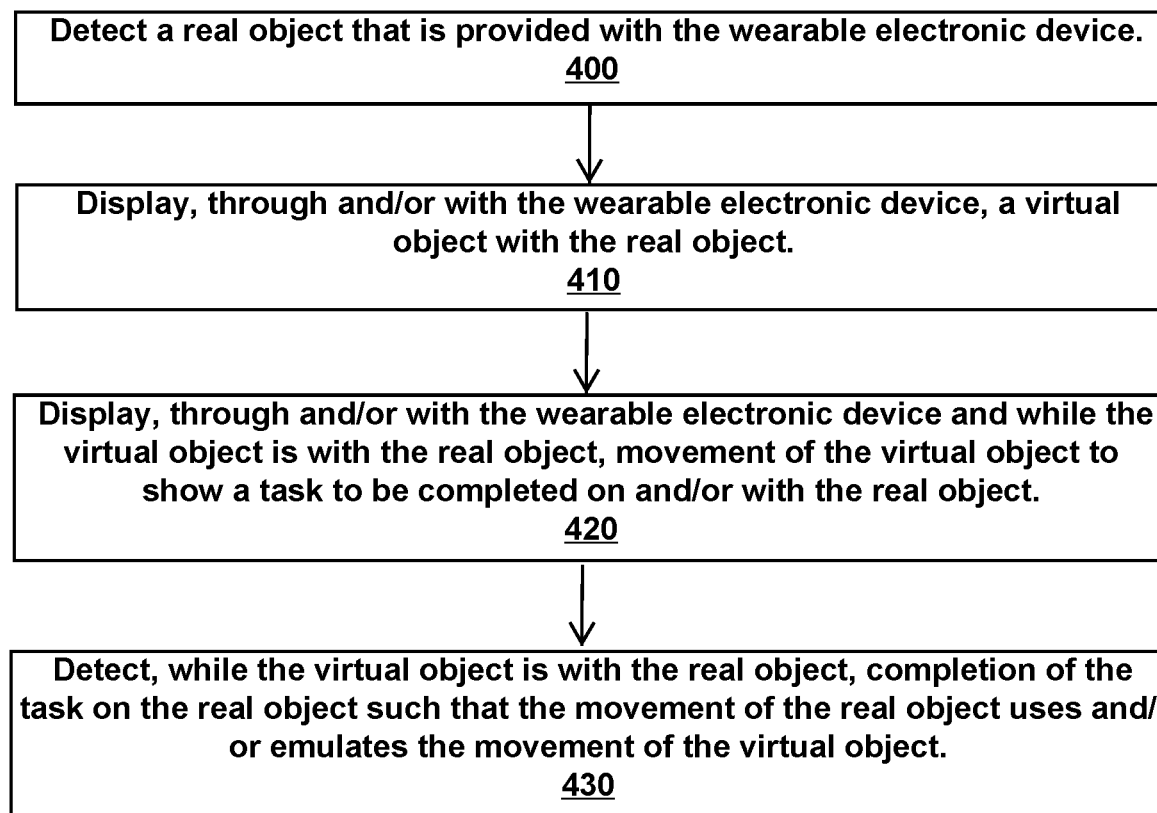
FIG. 4 is a method to display a virtual object with a real object and detect completion of a task on the real object in accordance with an example embodiment.

FIG. 4 is a method to display a virtual object with a real object and detect completion of a task on the real object.

Block 400 states detect a real object that is provided with the wearable electronic device.

The wearable electronic device and/or another electronic device can detect the real object. For example, the real object is seen with or visible through the wearable electronic device and/or detected with, captured with, or provided by the wearable electronic device.

Block 410 states display, through and/or with the wearable electronic device, a virtual object with the real object.

For example, the virtual object is displayed on a display of the wearable electronic device or provided by or seen through the wearable electronic device. The virtual object exists adjacent to, on, or with the real object. For instance, the virtual object is simultaneously or concurrently provided with the real object such that the virtual object exists next to, near, overlapping with, over, or on top of the real object.

A size, a shape, and/or a color of the virtual object can emulate or copy a size, a shape, and/or a color of the real object. The virtual object looks like or has a similar physical appearance of the real object. For instance, the virtual object emulates a physical appearance of the real object or is a copy of the real object. Alternatively, the virtual object can be different than the real object.

Block 420 states display, through and/or with the wearable electronic device and while the virtual object is with the real object, movement of the virtual object to show a task to be completed on and/or with the real object.

The virtual object moves to show or illustrate current, intended, or future movements of the real object. These movements of the virtual object can occur before the movements of the real object to show a task or an action to be completed or performed on and/or with the real object. For instance, the virtual object executes a series of movements or operations, and the real object subsequently emulates the movements or operations of the virtual object. The virtual object can provide instructions for, to, or with the real object. For instance, such instructions illustrate or provide information for what actions should be taken on or with the real object. Further yet, such instructions are not limited to actual movements of the virtual object and/or the real object but include sound (such as spoken words), text (such as written words or characters), graphics, drawings, color, images, projections, light, etc.

Block 430 states detect, while the virtual object is with the real object, completion of the task on the real object such that the movement of the real object uses and/or emulates the movement of the virtual object.

The wearable electronic device and/or another electronic device can detect or determine when or if the real object completed or performed the instructed task. For instance, the real object completes the task when the real object performs one or more movements that copy or emulate the one or more movements of the virtual object. As another example, the real object completes the task when the real object follows instructions provided by the virtual object.

Consider an example in which a user wears a pair of wearable electronic glasses. The user stands next to and views a computer printer (i.e., a real object) through a lens of the wearable electronic glasses. The user would like help with operating the printer and requests virtual assistance. In response to this request, a virtual image of the computer printer appears in the field of view of the user. This virtual image is a virtual printer that looks like the make and model of the real computer printer of the user. For instance, a display of the wearable electronic glasses provides or projects the virtual image of the computer printer next to the actual or real computer printer. The virtual printer moves or provides instruction in response to a query from the user. For example, if the real printer has a paper jam, then the virtual printer shows operation of a series of steps to fix the paper jam. For instance, the virtual printer shows a sequence of steps as follows: opening its front paper tray; removing paper stuck in this tray; closing the front paper tray; opening a rear or back cover; removing paper jammed in rollers; and closing the rear or back cover. The virtual printer thus provided instruction and assistance on how to cure an actual paper jam in the computer printer of the user.

In this example, the computer printer detects a location of the paper jam, retrieves the appropriate virtual image sequence, and provides this sequence to the wearable electronic glasses of the user. After each step of this process, a determination is made as to whether the task showed by the virtual object is performed on the real object. When the task is correctly performed on the real object, an indication is provided to the user (such as a verbal or visual indication that the user correctly performed the task). When the task is not correctly performed on the real object, an indication is provided to the user (such as a verbal or visual indication that the user did not correctly perform the task).

When a task is correctly performed on the real object, the virtual object proceeds to the next sequence. For example, while the virtual printer is displayed next to the real printer in the field of view of the user, the virtual printer opens its front paper tray. In response to this action, the user opens the front paper tray of the real printer. The real printer and/or the wearable electronic glasses determines a successful completion of this action, provides an indication of this successful completion to the user, and then proceeds to the next step in the sequence of curing the paper jam. For instance, the virtual printer next shows a virtual arm or person removing paper stuck in the front paper tray.

Consider another example in which a golf instructor wears a pair of electronic glasses while giving a golf lesson to a student. During the golf lesson, the golf instructor views and records a golf swing of the student with the electronic glasses and requests a virtual golf swing of a professional golfer to visually compare with the golf swing of the student. The recorded golf swing of the student and the virtual golf swing of the professional golfer are simultaneously played on or through a display of the electronic glasses so the golf instructor can compare the golf swing of the student with the golf swing of the professional golfer. This visual side-by-side comparison reveals a flaw in the swing of the student. The golf instructor assists the student in changing the golf swing to cure the flaw. The visual side-by-side comparison can also be saved or transmitted, such as being sent to the student to watch on a pair of electronic glasses or projected in an augmented reality so the student can view the side-by-side comparison.

Consider an example in which a user desires assistance in finishing an assembly of a robotic device. The user wears electronic glasses, looks at the partially assembled robotic device, and retrieves a program to assist in finishing the assembly. The program produces a three-dimensional line drawing of the robotic device and overlays or superimposes this line drawing over the actual partially assembled robotic device. This virtual overlay reveals that the robotic device is missing an arm component. A virtual arm component appears and becomes fastened to the virtual overlay. The user is able to see how the virtual arm component attaches to the robotic device. With this information, the user retrieves the actual arm component and attaches it to the actual robotic device as previously shown in the movements of the virtual overlay. The electronic glasses include sensors that confirm that the arm was successfully attached to the robotic device.

Consider an example in which a user cannot find a particular clothing store while shopping in a large mall. The user wears a pair of electronic glasses and requests assistance in finding the clothing store. A virtual image of a person appears in a field of view of the glasses, and this virtual person walks in a direction toward the clothing store. The user follows the virtual person down an escalator, past a food court, and toward an entranceway where the retail store is located. When the user reaches the retail store, the virtual person disappears from the view of the electronic glasses. Thus, the virtual person walked with and/or guided the person to the clothing store.

Consider an example in which a student is studying physics from a textbook that is linked to a pair of electronic glasses. The student reads the textbook while wearing the glasses. The glasses execute a program that tracks a location of where the student is reading in the textbook and automatically retrieves visual examples to assist the student in understanding the material. For instance, the textbook illustrates a two-dimensional image of an atom. This image, however, appears as a three-dimensional image when viewed with the glasses. Further, the glasses provide video and other images that assist the student in learning physics. This information is displayed through the glasses to the student while the student is reading from the textbook. Virtual examples being displayed to the student coincide with the current subject matter that the student is reading from the textbook.

Figure 5:
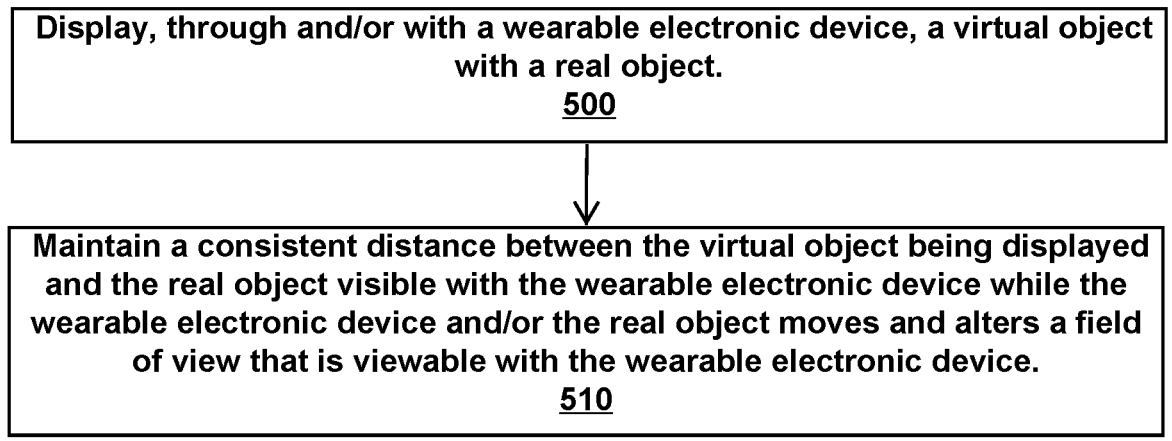
FIG. 5 is a method to maintain a consistent distance between a virtual object and a real object that are in a field of view of a wearable electronic device in accordance with an example embodiment.

FIG. 5 is a method to maintain a consistent distance between a virtual object and a real object that are in a field of view of a wearable electronic device.

Block 500 states display, through and/or with a wearable electronic device, a virtual object with a real object.

The virtual object can appear next to, above, below, besides, on, over, near, superimposed on, overlaid with, or partially on the real object. For instance, while the real object is visible with or in the field of view of the wearable electronic device, the virtual object also appears in the field of view. Thus the virtual object and the real object simultaneously or concurrently appear in the field of view of the wearable electronic device.

Block 510 states maintain a consistent distance between the virtual object being displayed and the real object visible with the wearable electronic device while the wearable electronic device and/or the real object moves and alters a field of view that is viewable with the wearable electronic device.

By way of example, the virtual object is positioned with the real object while the real object is in the field of view of the wearable electronic device. A user or wearer of the wearable electronic device is able to see both the real object and the virtual object at the same time. The real object is seen through the wearable electronic device while the virtual object is displayed to appear next to the real object.

A distance or separation can exist between the real object and the virtual object being displayed with or viewable with the wearable electronic device. This distance remains constant or consistent while the wearable electronic device and/or the real object moves and changes a location of the real object in the field of view of the wearable electronic device.

Consider an example in which a user wears a pair of wearable electronic glasses and views a tablet computer that sits on a table. The wearable electronic glasses generate and display on its lens a second tablet computer next to the real tablet computer. This second tablet computer does not actually exist on the table but is a virtual object that appears to exist on the table. Both of the tablet computers appear in a field of view of the wearable electronic glasses and thus are simultaneously visible to the user. A distance of about four inches separates the virtual tablet computer from the real tablet computer. When the user moves his head and therefore moves a position of the wearable electronic device, the distance between the two tablet computers remains consistent (i.e., remains at four inches). This distance remains consistent since a location on the lens of where the virtual tablet computer is located changes. If this location did not change, then the virtual tablet computer would move in synchronization with movements of the wearable electronic glasses. As such, the location on the lens of the virtual tablet computer adjusts to offset the movement of the wearable electronic glasses.

Continuing with this example, the user looks at the table such that the virtual and real tablet computers appear in a center of a field of view of the user. While the user moves or rotates his head twenty degrees clockwise or counterclockwise, the distance between the two tablet computers remains constant at four inches. In this example, a position of the real object did not change since it remains unmoved on the table.

Still continuing with this example, while both the virtual and real tablet computers are in the field of view of the wearable electronic glasses, the real tablet computer moves ten inches farther away from a location of the virtual tablet computer. During movement of the real tablet computer, a location of the virtual tablet computer on the lens changes to maintain a consistent distance of four inches between the virtual and real tablet computers. The virtual tablet computer moves to follow a path or trajectory of the real computer such that a distance or separation between the two objects appears to the wearer to be unchanged.

One example embodiment moves a position of the virtual object on a display of the wearable electronic device in order to maintain a consistent position between the virtual object and the real object. This movement of the virtual object offsets or counters the movement of the wearable electronic device and/or the real object so the virtual object appears to not move with respect to the real object seen through the wearable electronic device.

Consider an example in which a virtual object (e.g., a mobile phone) is displayed on a display or lens of a pair of wearable electronic glasses such that this virtual object overlaps a real object (e.g., a mobile phone) that is in a field of view of a user wearing the glasses. The virtual object and the real object appear centered in the field of view of the user, and the virtual mobile phone is a same make, model, and size of the real mobile phone and is overlaid on top of the real mobile phone. The user rotates his head forty-five degrees counterclockwise. If a position of the virtual mobile phone did change with respect to the display or lens, then the virtual mobile would no longer appear overlaid upon the real mobile phone but appear forty-five degrees in a counterclockwise position removed from the real mobile phone. In order to counteract this movement, a position of the virtual mobile phone on the display or lens of the wearable electronic glasses is changed. In this example, the virtual mobile phone is rotated forty-five degrees clockwise to counter the forty-five degree counterclockwise movement of the wearable electronic glasses. Thus, the virtual mobile phone moves in an opposite direction to that of the wearable electronic glasses in order to generate an appearance that the virtual mobile phone did not move with respect to the real mobile phone.

In an example embodiment, movement of the virtual object on a lens or display of the wearable electronic device is equal to and opposite to movement of the wearable electronic device and/or the real object. This equal and opposite movement of the virtual object occurs simultaneously and in real-time with the movement of the wearable electronic glasses and/or the real object. In this manner, the virtual object appears not to move to a user and thus remains in a consistent relationship with the real object while both objects are being viewed with the wearable electronic glasses.

Consider an example in which the real object is a remote controlled motorized vehicle that a user views with a wearable electronic device. A virtual image of this motorized vehicle appears to the user to be below the motorized vehicle. In response to receiving transmission signals, the motorized vehicle moves in a curved path with a northward direction. The virtual image follows the motorized vehicle and also moves in the curved path with the northward direction while maintaining a consistent distance from the motorized vehicle. During movement of the motorized vehicle, neither the user nor the wearable electronic device moves. If the wearable electronic device also moved during movement of the motorized vehicle, then the virtual image would move to offset and/or counter this movement as well.

Consider an example in which a user wears a pair of wearable electronic glasses that projects an image of a soda can (i.e., the virtual object) next to a real glass with ice (i.e., the real object). While viewing the soda can and the glass, the user moves his head ten degrees upward and twenty degrees clockwise. In order to counter this movement, the wearable electronic glasses changes a position of the projection of the soda can ten degrees downward and twenty degrees counterclockwise. From a point of view of the user, the soda can and the glass did not move. This change of the projection of the soda can causes the soda can to appear to remain unchanged or unmoved next to the glass.

Consider an example in which a user wears a pair of wearable electronic glasses that provides a virtual image of a document with written text (i.e., the virtual object) on top of a flat, white surface (i.e., the real object). The virtual document with the written text appears to exist on the surface. While reading the text of the virtual document, the user looks away from the surface and simultaneously moves his head in the direction of the look. In order to counteract this head movement, the wearable electronic glasses shifts or moves the virtual text with a speed and direction that are equal and opposite the speed and direction of the movement of the head of the user. This counteraction causes the virtual document to appear to remain still and unchanged while being provided on the surface.

FIG. 6 is a method to move a location of a virtual object in response to movement of a wearable electronic device and/or a real object.

Block 600 states display, through and/or with a wearable electronic device, a virtual object with a real object.

The virtual object can appear next to, above, below, besides, on, over, near, superimposed on, overlaid with, or partially on the real object. For instance, while the real object is visible with or in the field of view through the wearable electronic device, the virtual object also appears in the field of view. Thus the virtual object and the real object simultaneously or concurrently appear in the field of view of the wearable electronic device.

Block 610 states move, in response to movement of the wearable electronic device and/or the real object, the virtual object from being at one location with respect to the real object to being at another location with respect to the real object.

The virtual object moves around the real object as the distance between the virtual object and a perimeter or edge of the field of view changes. Movement of the wearable electronic device and/or the real object can cause a space between the virtual object and the perimeter to decrease such that there is no longer sufficient space for the virtual object at its current location in the field of view of the wearable electronic device. When the space is no longer sufficient, the virtual object moves to a new location in the field of view with respect to the real object. This action of moving the virtual object around the real object or within the field of view maintains the virtual object in the field of view while the wearable electronic device and/or the real object moves. This action also extends an amount of time that the virtual object appears with the real object. If the virtual object were not moved, then it would disappear from the field of view of the wearable electronic device and hence not be visible to the wearer.

For example, as the wearable electronic device moves, a distance or space between an edge or perimeter of the field of view and the real object and/or the virtual object can increase or decrease depending on the direction of movement of the wearable electronic device. For example, if the real object is located in a center of the field of view of the wearable electronic device and a head of a user moves to his left, then space from a right side of the perimeter of the field of view decreases while space from a left side of the perimeter of the field of view simultaneously increases. If the virtual object were displayed on the right side of the real object, then movement of the wearable electronic device to the left may cause the virtual object to fall outside of the field of view. In other words, as the wearable electronic device continues to move to the left, a distance decreases between the virtual object and a right side of the perimeter of the field of view. If the virtual object does not move its location, then the virtual object will be pushed out of the field of view of the wearable electronic device. To compensate for this movement, the virtual object is moved to a location in the field of view where more space exists between the real object and the perimeter. In this example, the virtual object could be moved from a right side of the real object and to a left side of the real object.

The virtual object can switch or move locations with respect to the real object as the wearable electronic device moves and alters the field of view for a user and/or as the real object moves within the field of view. When an available space in the field of view for the virtual object shrinks or becomes too small to house or include the virtual object, the virtual object moves or switches to a new location that has more space in the field of view. Thus, the virtual object can switch or move locations within the field of view and with respect to the real object in order to compensate for movement of the wearable electronic device and/or movement of the real object.

By way of example, the virtual object moves to a new location in the field of view when its current location becomes too small to accommodate a size and/or shape of the virtual object. This new location changes a position of the virtual object with respect to the real object. For example, the virtual object moves from one side of the real object to an opposite side of the real object (such as moving from above the real object to below the real object or moving from a right side of the real object to a left side of the real object or moving from being in front of the real object to being behind the real object).

Consider an example in which a user wears a pair of wearable electronic glasses that provides an elliptical field of view. A real object is located in a center of the ellipse, and a virtual object is displayed on the lens of the glasses and next to and to the left of the real object from the point of view of the user. As the user moves his head to his right, an edge or a perimeter on a left side of the field of view simultaneously moves toward the virtual object. This movement shrinks an available space in the field of view for the virtual object. If the user continues to move his head in the rightward direction, then the virtual object will be outside of the field of view of the user and hence no longer visible. To prevent this from happening, the virtual object moves to a new location with respect to the real object. In this instance, since the user is moving his head to the right, available space on a right side of the real object increases. The virtual object switches from being located at a left side of the real object to being located at an opposite right side of the real object to counteract the movement of the wearable electronic device and change in the field of view.

Consider an example in which a user wears a pair of wearable electronic glasses that provides a field of view that includes a computer (i.e., the real object) and a virtual computer (i.e., the virtual object). The virtual computer is situated to a right side of the real computer. A person picks up the real computer and moves it to the location that the virtual computer occupies. In response to this movement, the virtual computer changes location and moves to a location previously occupied by the real computer (i.e., move the virtual computer to the location where the real computer was located right before the person moved it).

Consider an example in which the virtual object is located in front of the real object from the point of view of the user (i.e., the virtual object is located between the user and the real object). The user moves toward the virtual object and the real object such that the user now physically occupies the space in the real world where the virtual object appeared to be. In response to this movement, the virtual object is moved to a new location that is located behind the real object (i.e., now the real object is located between the user and the virtual object).

Consider an example in which the wearable electronic device presents a user with a square or rectangular shaped field of view with a real object located in a center of the field of view and a virtual object located adjacent to the real object. As the wearable electronic device moves, the real object is no longer located in a center of the field of view. In response to this movement, the virtual object changes or switches locations with respect to the real object. For instance, the virtual object moves from one corner of the square or rectangular field of view to another corner of the field of view. The virtual object can also move from being located above the real object to being located below the real object or from being located on one side of the real object to being located on an opposite side of the real object.

The virtual object can move to various locations within the field of view in order to extend a length of time in the field of view as the wearable electronic device and/or the real object moves. For example, as the wearable electronic device and/or real object moves, the virtual object moves in order to increase a length of time that the virtual object is visible within the field of view.

Furthermore, the virtual object can move to various locations within the field of view in order to avoid colliding with an edge of the field of view. For example, as the wearable electronic device moves, the virtual object moves to different locations around a perimeter of the real object to avoid occupying a location that would be outside of the field of view.

Furthermore, the virtual object can move to locations in the field of view with a maximum size or maximum available or free space to accommodate the virtual object. For instance, if a greatest or largest unoccupied area in the field of view is located below the real object, then the virtual object moves to occupy this area.

The virtual object can change position, orientation, shape, and/or size with respect to the real object in response to movement of the real object and/or wearable electronic device (even if the wearer of the wearable electronic device of the wearable electronic device itself does not move). For example, as the real object moves within the field of view of the wearable electronic device, the virtual object also moves in this field of view in response to these movements.

As one example, when a user picks up the real object and moves it one foot to his right, then the virtual object simultaneously moves one foot to the right. When the real object moves, the virtual object also moves to maintain a consistent relationship with respect to the real object. The virtual object can track or follow movements of the real object.

As another example, a virtual object is shown with a perspective view to a user in a field of view of electronic glasses. A real object also in this field of view moves toward the virtual object. In response to this movement, the electronic glasses change the view and present the virtual object with a plan view to the user.

As another example, a virtual object is shown rotating as rotating about an imaginary x-axis in the real-world to a user in a field of view of electronic glasses. A real object also in this field of view moves toward the virtual object. In response to this movement, the electronic glasses change the virtual object from rotating about the x-axis to rotating about a z-axis.

As another example, a user wears a pair of wearable electronic glasses and views a person that is the real object. A virtual image of this person appears as the virtual object next to the real person. As the person (i.e., the real object) walks away from the user, the virtual image of the person (i.e., the virtual object) simultaneously walks away from the person. The virtual object emulates the walking movement of the person such that the arms, legs, body, head, etc. of both the real and virtual persons move in stride or in synchronization with each other as the real person walks away. Additionally, as the real person walks away, he becomes smaller (i.e., as the person moves farther away from the user, the person appears smaller to the user because the visual angle of the user decreases). A size of the virtual object contemporaneously decreases such that the two objects appear to get smaller together as the person walks away into the distance.

FIG. 7 is a method to display, with and/or through a wearable electronic device, actions to virtual objects received from an electronic device.

Block 700 states provide or capture, with a wearable electronic device, a real location with real objects.

For instance, a user wears the wearable electronic device that offers a field of view through its lens of the real location in the real-world and the real objects located in the real location. This real location can be a place (such as a third floor of a building), a scene (such as a view from a window), a geographical location (such a Global Positioning System, GPS, location on earth), an area (such an interior of a retail store), etc.

Block 710 states display, on a display of an electronic device, a virtual location with virtual objects that emulate the real location and the real objects.

The virtual location emulates, copies, or represents the real location, and the virtual objects emulate, copy, or represent the real objects. The virtual location and the virtual objects have one or more features that match or imitate the respective real location and real objects. For instance, a display of an electronic device displays a virtual hospital operating room that emulates a real hospital operating room that is remotely located from the electronic device. The virtual hospital room thus appears to be the real hospital room.

The electronic device can receive or obtain the real location and/or real objects from memory, a transmission, the wearable electronic device, another electronic device, etc.

Block 720 states receive, at the electronic device, actions to one or more of the virtual objects at the virtual location.

An action (such as a thing done, a movement, an accomplishment, or a task) is performed on or with respect to one or more of the virtual objects being displayed in the virtual location. For instance, a user interacts with a user interface (UI) or graphical user interface (GUI) of the electronic device to select, move, highlight, point to, grab, alter, or remove one of the virtual objects. As another example, a user covers or blocks a virtual object in the virtual location with his hand, his arm, or a person that appears in the virtual location. As yet another example, a person at the electronic device interacts with an augmented reality system to impose an image at the virtual location and/or with the virtual objects.

Block 730 states display, through and/or with a display of the wearable electronic device, the actions such that the actions to the one or more virtual objects at the virtual location are reproduced with respect to the real objects at the real location.

The actions to the one or more virtual objects and/or at the virtual location are reproduced, displayed, emulated, copied, replicated, and/or provided to the corresponding one or more real objects and/or real location at the wearable electronic device.

Consider an example in which a handheld portable electronic device (HPED) displays an interior of a virtual retail store that sells groceries. This virtual retail store emulates or looks like a real retail store in the real-world that includes aisles with shelves of food items that are available for selection and purchase. The virtual retail store being displayed on the HPED also includes the same aisles, shelves, food, etc. as the real retail store. A user interacts with a GUI of the HPED to select a can of soup on a third shelf of aisle five in the virtual store. The user drags this can of soup from the shelf into a shopping cart. A wearer of a wearable electronic device physically enters the retail store and proceeds to the aisle five. In this aisle, the third shelf has cans of soup. One of the cans of soup is virtually marked or distinguished to instruct the wearer that the user selected this particular can of soup. For example, the can of soup is highlighted or outlined with a color or other indicia on the display of the wearable electronic device so the wearer is able to determine and select the correct can of soup. The wearer grabs the physical can of soup from the third shelf in aisle five and places the can of soup in a shopping cart. The selected can of soup is then delivered to the home of the user of the HPED.

Consider an example in which a factory warehouse stores large numbers of crates that are moved on a daily basis and are shipped to different parts of the world. A foreman of the warehouse uses a tablet computer to display a virtual or real image of the warehouse. The foreman selects crates from one location and moves them to another location. Next, the foreman opens, on the display, a shipping container, selects items from the container, and moves them to different locations through the warehouse. These actions of the foreman with the warehouse are stored on a cloud server and are assigned as a workflow to a forklift operator named John. Later, John comes to work, dawns a pair of wearable electronic glasses, and retrieves the workflow from the server. The workflow commences and John sees the crates (previously selected by the foreman) as being highlighted. John drives the forklift to this location and moves the crates to the different locations that are indicated in the workflow. After completion of these tasks, the wearable electronic glasses show the next series of tasks of moving the items from the shipping container. Actions to be performed on the physical items in the warehouse are displayed on the wearable electronic glasses such that John knows which items to select, where to move the items with the forklift, and a sequence of the workflow per the instructions of the foreman on the tablet computer.

Consider an example in which an elderly man desires to have a clerk go grocery shopping on behalf of the man. The clerk wears a pair of wearable electronic glasses, and video from these glasses appears on a display of an electronic device of the man. While the clerk is at the store, the man interacts with the display to instruct the clerk where to go in the store. When the man sees on his display a food item that he desires, he taps the display to highlight the food item. This action simultaneously causes the clerk to see a virtual identification through the lens or with the display of the wearable electronic glasses. Thus, actions of the man with his display appear in real-time as virtual identifications or visualizations with the wearable electronic glasses. For example, the real food item and its location in the store are marked or distinguished with the wearable electronic glasses so the clerk knows which item to select for the man. In this manner, the clerk acts as a proxy or agent for the man and performs the grocery shopping per the real-time instructions from the man.

Figure 8:
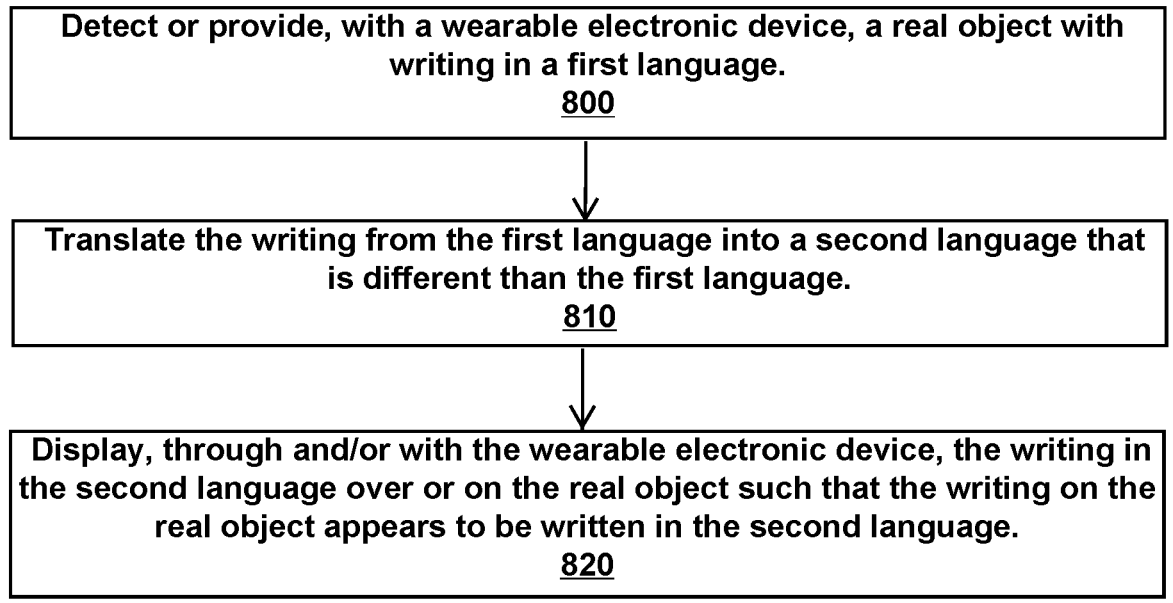
FIG. 8 is a method to display a translation of a writing on a real object in accordance with an example embodiment.

FIG. 8 is a method to display a translation of a writing on a real object.

Block 800 states detect or provide, with a wearable electronic device, a real object with writing in a first language.

The wearable electronic device detects or provides an object or a document with writing in the field of view of the wearable electronic device. A determination is made of the language of the writing. For example, a paper document on a desk of a user is written in French language. The user wears a wearable electronic device while viewing the document, and the wearable electronic device communicates wirelessly over a cloud with an optical character recognition (OCR) engine that determines the document is written in French. As another example, writing on a computer screen is written in Chinese and viewed with a user that wears a wearable electronic device.

Block 810 states translate the writing from the first language into a second language that is different than the first language.

The wearable electronic device and/or another electronic device translate the writing of the real object into another language. For example, if a document is written in Chinese, then the wearable electronic device translates the writing on the document into English. A user or electronic device can select the language into which the writing on the document is translated. As another example, a real object includes writing in Spanish. This writing is translated with a server from Spanish to English, and the translation is transmitted to the wearable electronic device.

Block 820 states display, through and/or with the wearable electronic device, the writing in the second language over or on the real object such that the writing on the real object appears to be written in the second language.

Writing on the real object is translated into another language, and this translated writing is superimposed on or provided with the real object with the wearable electronic device. To a wearer of the wearable electronic device, the real object appears to be written in the second language. For example, a virtual image of the writing in the second language appears over and covers the writing in the first language.

Consider an example in which a user navigates with an HPED to a website that is written in English. The user wears a pair of wearable electronic device that stores or communicates with optical character recognition (OCR) software or engine that translates the written English text of the website into Spanish. This Spanish text is then displayed through the wearable electronic device such that the website appears to be written in Spanish while the user views the website through the wearable electronic device. Thus, even though the website is actually written in English, the website appears to the wearer of the wearable electronic device to be written in Spanish. Virtual Spanish text is displayed on or through the lens of the wearable electronic device in locations that correspond with the respective English text on the website.

Consider an example in which a user types a letter in English on his notebook computer. After the letter is written, the user dawns a wearable electronic device, selects French language, and views letter with the wearable electronic device. The English text of the letter is translated into French that appears through a display of the wearable electronic device. Thus, as the user views the letter on his notebook computer with the wearable electronic device, the letter appears to be written in French.

Consider an example in which a user living in Canada receives a box in the mail from China. An exterior surface of the box includes writing in Chinese. The user is unable to read Chinese and views the box with a wearable electronic device that includes a display. This display shows the Chinese writing to be in English. Thus, from the point of view of the user, the exterior surface of the box appears to be written in English, not Chinese. Virtual text in English appears on the box at the locations with Chinese text.

Figure 9:
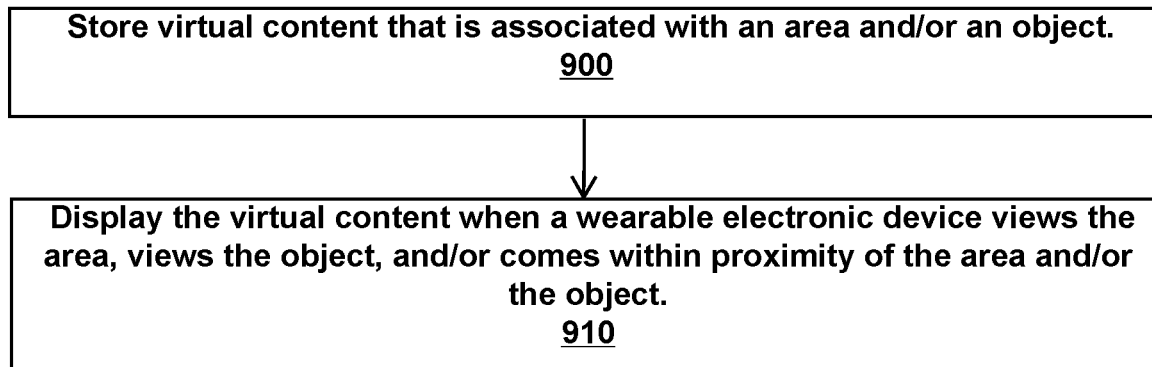
FIG. 9 is a method to display virtual content associated with an area or an object when a wearable electronic device views the area, views the object, and/or comes within proximity of the area and/or the object in accordance with an example embodiment.

FIG. 9 is a method to display virtual content associated with an area or an object when a wearable electronic device views the area, views the object, and/or comes within proximity of the area and/or the object.

Block 900 states store virtual content that is associated with an area and/or an object.

Virtual content is stored in memory, such as being stored on a cloud server, a wearable electronic device, or an electronic device. This virtual content is associated with an area (such as a geographical area or location) and/or an object (such as a person, a thing, or something that is visible or tangible).

Block 910 states display the virtual content when a wearable electronic device views the area, views the object, and/or comes within proximity of the area and/or the object.

Virtual content is retrieved, transmitted, obtained, displayed, or activated when the wearable electronic device views the area, views the object, and/or comes within proximity of the area and/or object.

Consider an example in which a user purchases a new computer that includes virtual content (such as virtual operating instructions). These instructions play through a wearable electronic device as virtual images or virtual video. For instance, upon purchasing the computer, the user is granted access to 3D virtual instructions on using and operating the computer. The user dons a pair of wearable electronic glasses and views the computer with the glasses to activate the instructions. While the computer is located within the field of view of the glasses, virtual instructions play through the glasses. The user sees the instructions and hears audio associated with the instructions simultaneously while viewing the computer. These instructions assist the user in performing actions on the computer (such as assisting the user to start or operate the computer, connect to a network or other electronic device, download or upload data, configure settings, etc.). These instructions can play next to, over, or near the computer that is within the field of view of the glasses. The instructions stop playing when the user looks away from the computer such that the computer is no longer in the field of view of the user.

Consider an example in which a person (John) records a video of himself talking in order to leave a virtual video message for his friend (Peter). The video is transformed into a 3D virtual image of John with his voice as audio. John transmits the video recording to Peter with playback instructions to replay the video recording when Peter enters his office. Peter receives a message on his HPED that indicates he has a message from John, but Peter cannot retrieve or view the message until he is located at the playback location. When Peter arrives at his office, he retrieves and activates the video recording with his wearable electronic device (e.g., an electronic wristwatch with a display). Peter views the virtual video recording of John while sitting in his office. Activation, retrieval, and/or viewing of the message were contingent on Peter being at a certain or predetermined geographical location (i.e., his office). The message would not play until Peter was physically located at the office since Peter was required to be present at this location to retrieve and/or activate the message from memory.

Consider an example in which a mother bakes cookies and places them on a plate on a counter in the kitchen. While wearing a pair of electronic glasses, she views the plate of cookies and activates a message mode. The electronic glasses sense her hand that draws a virtual red circle in the air around the cookies and records her voice saying, "Do not eat until after dinner." Later, the mother's son enters the kitchen while wearing his electronic glasses. His field of view encounters the plate of cookies, and he sees a virtual red circle around the plate of cookies. He enters message mode with his glasses, points his hand toward the cookies, and a verbal message is played from this glasses saying, in his mother's voice, "Do not eat until after dinner." Thus, playback of the message and viewing of the virtual content were tied to the son being at the physical location and looking in a particular direction (i.e., having the plate of cookies being in his field of view with the glasses).

Consider an example in which a person (Sally) interacts with a tablet computer to shop at an online retail store (named Store ABC). A navigable image of the store appears on the tablet computer as a virtual store. This virtual store has a physical, real store as a counterpart in a shopping complex (i.e., Store ABC exists in a shopping complex and as a virtual store accessible over the Internet). Thus, a location and existence of items in the virtual store shown on the tablet computer correspond with a location an existence of the same items in the actual retail store. Sally interacts with the tablet computer to select a black shirt with size medium, which is the last black shirt available in this size. When she selects the shirt with the tablet computer, the shirt is marked or tagged in both the retail store and the virtual online store as being sold, taken, or not available. Sally finishes shopping and pays for the shirt. The actual or physical shirt remains in the retail store since the shirt has not yet been retrieved by Sally or by a store employee. Later, while wearing a pair of electronic glasses, another person (Mary) goes to the shopping complex and enters Store ABC. Mary intends to buy the same black shirt with size medium as Sally previously purchased. Mary finds the black shirt but notices a virtual indication or mark on the black shirt that notifies her that the shirt is sold and not available to purchase. This indication or mark appears as a virtual image on or through the display of her electronic glasses.

Consider an example in which a user wears a wearable electronic device while shopping in a store. When the user comes within ten feet of clothes rack, a 3D virtual advertisement for the clothes on the rack begins to play through the wearable electronic device of the user. This advertisement automatically plays on wearable electronic devices of other users when these users physically enter within a radius of ten feet from the clothes rack.

Virtual content associated with an area and/or an object can also be displayed when a user focuses her or his eyes on the area and/or object. Focus of the eyes on the area and/or object triggers or activates the virtual content. For example, the wearable electronic device includes, uses, or communicates with eye tracking software to determine a direction of gaze or focus and/or where the eyes of the user are focused.

Consider an example in which a wearer of a wearable electronic device focuses on a real object with his eyes. When the wearer focuses on this object, a virtual object that emulates this real object activates and appears on a lens or a display of the wearable electronic device. When the wearer looks away and changes his eyes from focusing on this object, then the virtual object disappears and/or is removed from appearing on the lens or the display.

Consider an example in which a user wears electronic glasses and shops in a retail store with various racks and items. A field of view of the user includes three different clothes racks. When the user focuses her eyes on one of the racks, an advertisement for clothes in this rack appears and plays with the electronic glasses. Advertisements for the other two clothes racks do not play for the user since her eyes are not focused on those racks. The electronic glasses determine on which rack her eyes are focused and retrieve and play the advertisements for that rack.

Consider an example in which a user wears a wearable electronic device that includes an eye tracker that measures or determines a point of gaze of the user and/or motion of an eye relative to a position of the head. The user walks in an airport that includes various physical signs. When the user focuses on one of these signs, additional information or instructions are visually displayed to the user through or with the wearable electronic device.

Figure 10:
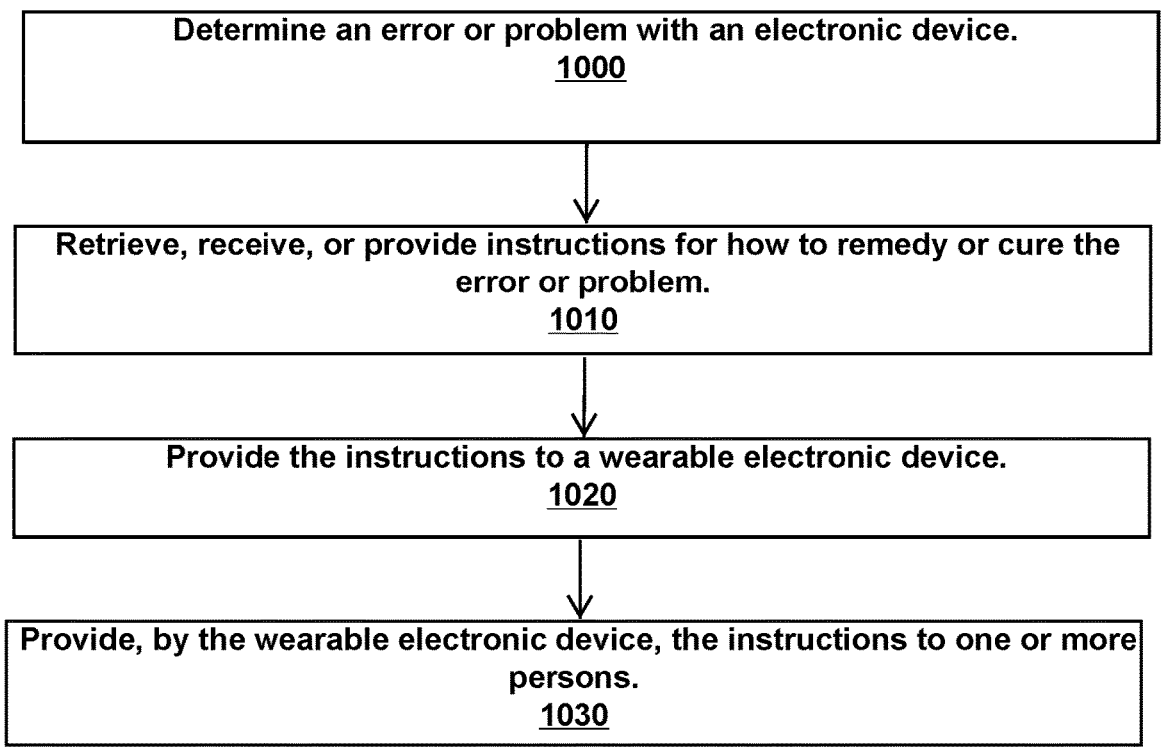
FIG. 10 is a method to provide instructions to a wearable electronic device for how to cure an error with an electronic device in accordance with an example embodiment.

FIG. 10 is a method to provide instructions to a wearable electronic device for how to cure an error with an electronic device.

Block 1000 states determine an error or problem with an electronic device.

The electronic device can diagnose its own error or problem or receive this diagnosis from another electronic device. For example, a printer determines that it has a paper jam in tray number two. As another example, a tablet computer determines that it has a virus or a corrupt file. As another example, a server in communication with an HPED determines that the HPED has outdated software and notifies the HPED of this determination. As another example, a wearable electronic device communicates with the printer, and the two electronic devices determine that the printer is offline and not connected to the Internet.

Block 1010 states retrieve, receive, or provide instructions for how to remedy or cure the error or problem.

For example, the electronic device retrieves the instructions from its own memory or from another memory (such as receiving the instructions from a cloud computing device that is in communication with the electronic device). The instructions can include video, audio, and/or virtual images that instruct how to repair, fix, cure, remedy, or solve the error or problem.

Block 1020 states provide the instructions to a wearable electronic device.

By way of example, the electronic device transmits the instructions to the wearable electronic device or provides the wearable electronic device with a storage location or access for retrieving the instructions from another electronic device (such as providing the wearable electronic device with information to enable the retrieval of the instructions from a cloud server). Alternatively, the instructions are retrieved from memory of the wearable electronic device itself. For instance, a wearable electronic device determines that it has a problem, retrieves instructions to cure this problem, and stores the instructions in memory.

Block 1030 states provide, by the wearable electronic device, the instructions to one or more persons.

For example, the wearable electronic device displays, portrays, transmits, broadcasts, or projects the instructions such that the instructions can be viewed or heard by a wearer or user of the wearable electronic device.

Consider an example in which a printer determines that its ink cartridge is low and needs replaced. The printer sends a user a message to replace the ink cartridge. The user purchases a new ink cartridge but does not know how to replace the old ink cartridge with the new ink cartridge. The printer sends a sequence of virtual 3D video instructions to the user while the user is wearing a pair of electronic glasses. These instructions overlay on or superimpose on the printer and show the user step-by-step instructions on how to replace the old ink cartridge with the new ink cartridge. For example, step one shows a virtual front cover of the actual printer opening while the user views the actual printer. After the user opens the front cover of the printer, step two plays. This process continues until the user successfully changes the ink cartridge.

Consider an example in which an automobile determines that its engine oil is low and provides a message to the driver to add oil. The driver, however, does not know how to add oil to the automobile and requests virtual assistance. In response to this request, the automobile transmits instructions how to add oil to a wearable electronic device of the user. These instructions play a 3D video in augmented reality that shows step-by-step instructions on how to add oil to the automobile. The video plays while the user actually performs the task of adding oil. After the user completes one of the steps, then the video proceeds to the next step. For instance, the video pauses or stops after each step, waits for a confirmation that this step was successfully completed, plays the next step, pauses, waits for a confirmation that this step was successfully completed, etc.

Figure 11:
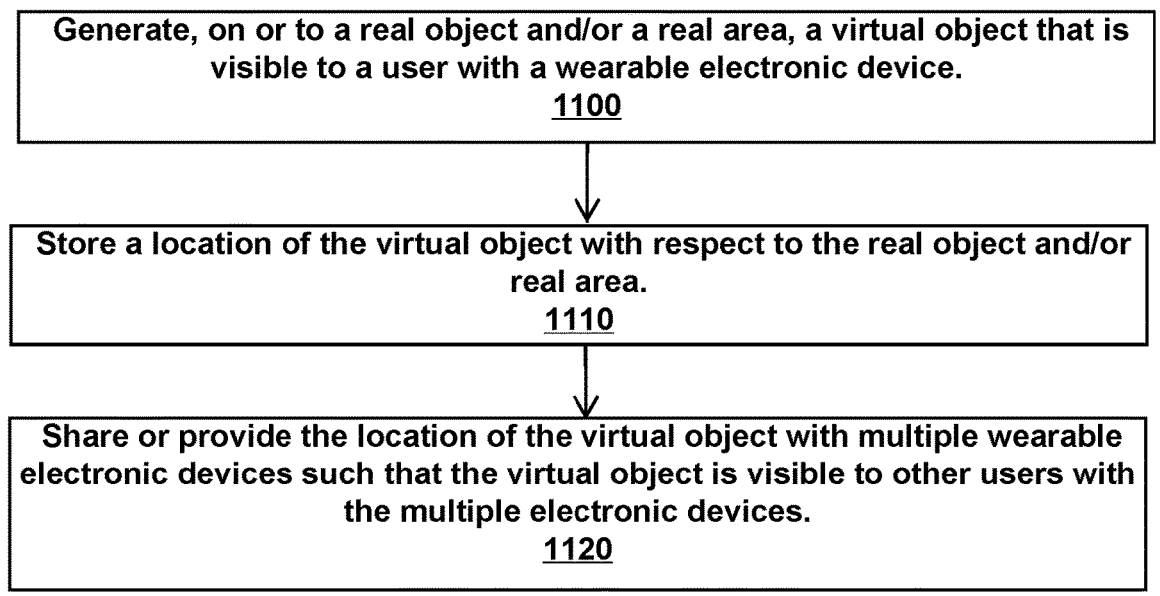
FIG. 11 is a method to share a location of a virtual object with multiple wearable electronic devices in accordance with an example embodiment.

FIG. 11 is a method to share a location of a virtual object with multiple wearable electronic devices.

Block 1100 states generate, on or to a real object or a real area, a virtual object that is visible to a user with a wearable electronic device.

For example, a virtual object is generated to, provided to, or retrieved to an object or an area that exist in the real world. This virtual object is visible with or through a wearable electronic device.

Block 1110 states store a location of the virtual object with respect to the real object and/or the real area.

The location of the virtual object is stored in memory. This location can include a mechanism to establish the location with respect to the real object or the real area, such as a tag, a coordinate, a marker, a visual reference, a GPS location, feature detection (such as corner detection, blob detection, edge detection, color detection), mapping, image processing, etc. By way of further example, augmented reality uses image registration to determine and restore real world coordinates.

Block 1120 states share the location of the virtual object with multiple wearable electronic devices such that the virtual object is visible to other users with the multiple wearable electronic devices.

For example, an electronic device transmits the location to the multiple wearable electronic devices. Users of these devices can simultaneously view the virtual image or virtual object at the location from different points of view or from different physical locations.

Consider an example in which different users are located in a room and wear wearable electronic devices. One of these users generates a 3D image that appears in the middle of the room. The wearable electronic device of this user transmits this image and its location to a server, and the server transmits the image and location to the other wearable electronic devices in the room. Each user can now see the 3D image that the user generated.

Consider an example in which users play a war game or a battle game. Each player carries a pretend gun that fires virtual ammunition (such as virtual bullets, lasers, projectiles, etc.) and wears a pair of electronic glasses. An object of the game is to shoot other players with the pretend gun to score points. A first player uses his pretend gun to shoot virtual shots at a second player. These virtual shots miss the second player but hit a wall and thus leave virtual bullet holes in the wall. A location of these shots, a number of shots, and damage to the wall are recorded and stored. Subsequently, when the first player, second player, or other players look at the wall, they see the wall with the bullet holes. The wall thus appears to all of the players to have been shot with bullets. During the game, the second player returns fire at the first player and a virtual bullet from the second player grazes an arm of the first player. Visual affects of the game attempt to mimic reality. In reality, this bullet would have caused a wound in the arm of the first user, so this wound is imitated in the virtual sense. Specifically, the first user appears to have a wound on his arm, though the wound is virtual. When the first player or other players view the arm of the first player, they see the wound caused from the virtual bullet. This wound remains with the first player as he moves around to different physical locations and continues the game.

Consider an example in which two people are standing next to each other and are wearing electronic glasses. Both people see a virtual printer that is located in front of them on a real table (i.e., a virtual printer is located on top of a real table). One of the wearers extends his hand to the virtual printer and raises a lid to the printer. Movements of the hand of the user are detected to determine the action of raising the lid of the virtual printer. In response to these movements, the lid of the virtual printer raises. Both people see the virtual printer with the raised lid.

FIGS. 12A-12D show a computer system or electronic device system 1200 that provides instructions to a wearable electronic device. This system 1200 includes a wearable electronic device 1210 worn on a user 1220 and an electronic device 1230 (such as a HPED) that communicates with the wearable electronic device 1210 over a network 1240.

A field of view 1250 is visible through or with the wearable electronic device 1210. By way of illustration, this field of view 1250 has an elliptical shape to represent a view or field of focus of the user 1220 through electronic glasses. Dashed lines 1260 represent a perimeter, periphery, or edge of the field of view 1250.

Figure 12A:
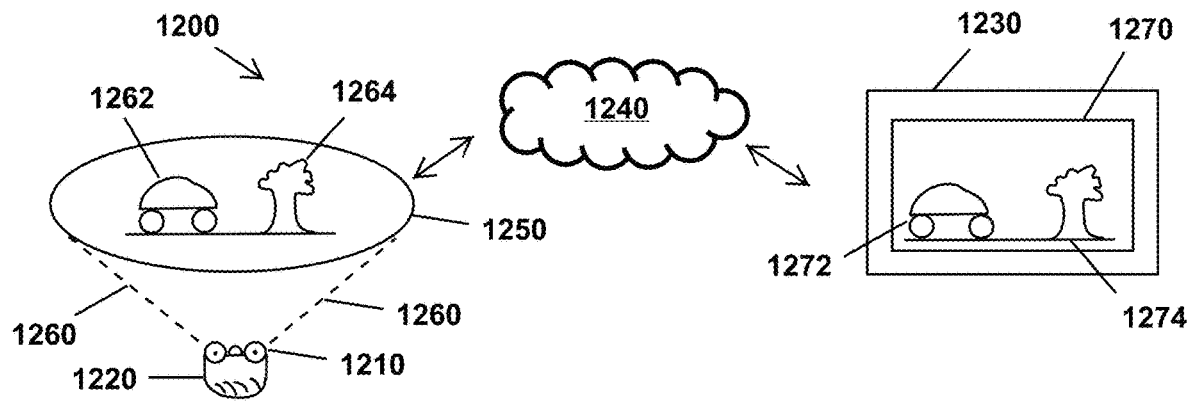
FIGS. 12A-12D show a computer system or electronic device system that provides instructions to a wearable electronic device in accordance with an example embodiment.

FIG. 12A shows the user 1220 looking straight ahead with a field of view that includes an automobile 1262 and a tree 1264 near the automobile. The wearable electronic device 1210 captures this image and transmits it through the network 1240 to a display 1270 of the HPED 1230. As such, a view of the wearable electronic device appears on the display of the HPED.

The display 1270 of the HPED 1230 includes an automobile 1272 and a tree 1274 near the automobile that represent the automobile 1262 and tree 1264 in the field of view 1250 for the wearable electronic device 1210. Real objects in the field of view 1250 can appear as similar or identical objects on the display 1270 of the HPED 1230. For instance, the real objects of the automobile 1262 and the tree 1264 appear as real objects of the automobile 1272 and the tree 1274. By way of example, the wearable electronic device 1210 captures video of the real objects, and this video is reproduced on the display 1270 of the HPED 1230. Real objects in the field of view 1250 can also appear as altered objects on the display 1270 of the HPED 1230. For instance, the real objects of the automobile 1262 and the tree 1264 are transformed and appear as virtual objects (e.g., the automobile 1272 and the tree 1274 are virtual images of the real automobile and the real tree). Further yet, the real objects in the field of view 1250 of the wearable electronic device 1210 can be altered. For instance, a virtual image of an automobile is included with or superimposed over the automobile 1262, and virtual image of a tree is included with or superimposed over the tree 1264. As another example, the automobile 1262 is replaced with a virtual automobile that emulates the real automobile, and the tree 1264 is replaced with a virtual tree that emulates the real tree.

Figure 12B:
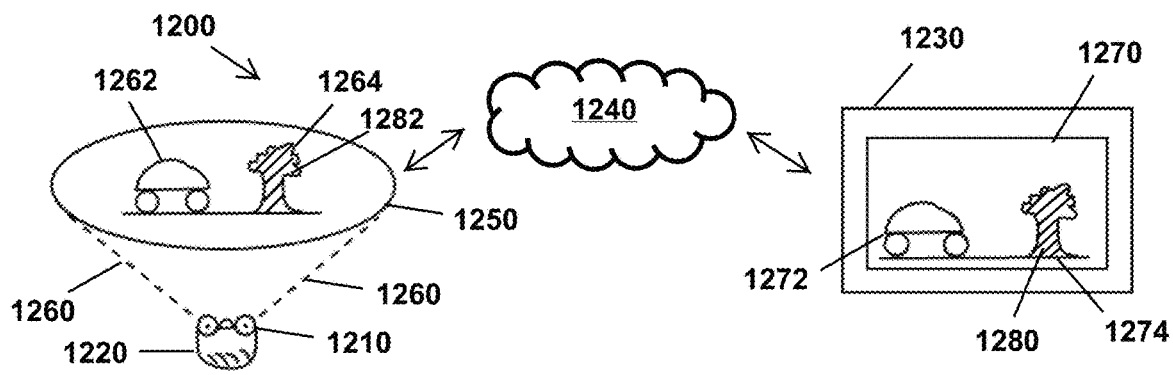

FIG. 12B shows instructions being issued from the HPED 1230, over network 1240, and to the wearable electronic device 1210. For illustration, the tree 1274 displayed on the HPED 1230 is marked, highlighted, or otherwise distinguished from other objects being displayed on the display 1270. For example, a virtual image or indication 1280 is superimposed on or provided with the tree 1274 on the HPED to visually illustrate or distinguish to a user the tree from the automobile 1272.

The indication 1280 (shown on the tree 1274 of the HPED) replicates or copies to the tree 1264 in the field of view 1250 of the user 1220. The user 1220 sees a virtual image or indication 1282 that distinguishes the tree 1264 from other objects (such as the automobile 1262) in the field of view 1250.

For illustration, the indications are shown as virtual parallel lines that appear on the tree 1274 on the HPED 1230 and on the tree 1264 in the field of view 1250. Other indications can be used, such as using highlights, colors, shading, non-parallel lines, light, etc. to mark or distinguish the tree. By way of example, a user interacts with the HPED and uses a user interface (UI) or graphical user interface (GUI) to add virtual marks to distinguish or to emphasize the tree. Furthermore, the indications shown on the HPED can be the same or different than the indications shown in the field of view.

Consider an example in which a user interacts with the HPED 1230 in order to control or instruct the user 1220 that wears the wearable electronic device 1210. The user of the HPED desires to instruct the user of the wearable electronic device to walk to the tree 1264. In order to provide this instruction, the user marks the tree 1274 and this mark appears as a virtual mark, virtual indicia, or virtual indication on the tree 1264. While wearing the wearable electronic device 1210, the user 1220 sees a virtual indication 1282 on or at the tree 1264 and proceeds in that direction as instructed.

Figure 12C:
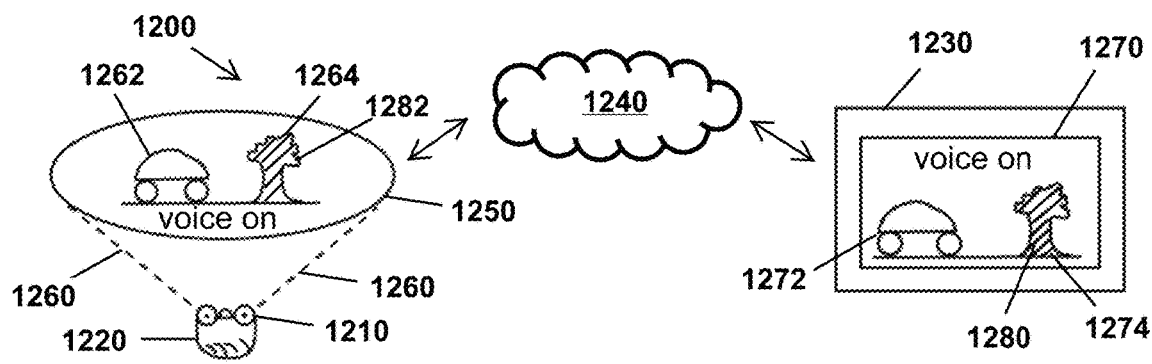

FIG. 12C illustrates the system 1200 in which voice control or activation assists in providing instructions from the HPED 1230, over network 1240, and to the wearable electronic device 1210. The display 1270 of the HPED 1230 includes a visual indication (shown as "voice on") to illustrate that the HPED is in voice control mode. Likewise, the field of view 1250 of the wearable electronic device 1210 includes a visual indication (shown as "voice on") to illustrate that the wearable electronic device 1210 is in voice control mode. This mode enables users to perform actions such as generating virtual instructions, communicating with each other using voice and issuing instructions or commands to an electronic device with voice.

Consider an example in which a user interacts with the HPED 1230 in order to control or instruct the user 1220 that wears the wearable electronic device 1210. The user of the HPED desires to instruct the user of the wearable electronic device to walk to the tree 1264. In order to provide this instruction, the user of the HPED speaks the following instructions: "Walk to the tree." In response to these verbal instructions, the HPED 1230 recognizes a tree in the view, marks the tree, and transmits this instruction to the wearable electronic device. The HPED marks the tree with a virtual mark, virtual indicia, or virtual indication on the tree 1264 and on the tree 1274. The user of the HPED sees the virtual indication 1280 on the tree 1274 and can confirm that the HPED marked or selected the correct tree. While wearing the wearable electronic device 1210, the user 1220 sees a virtual indication 1282 on or at the tree 1264 and proceeds in that direction as instructed. In this example, verbal commands are used to generate a virtual indication, apply this virtual indication to a real object, and transmit the virtual indication for the real object to another electronic device.

Figure 12D:
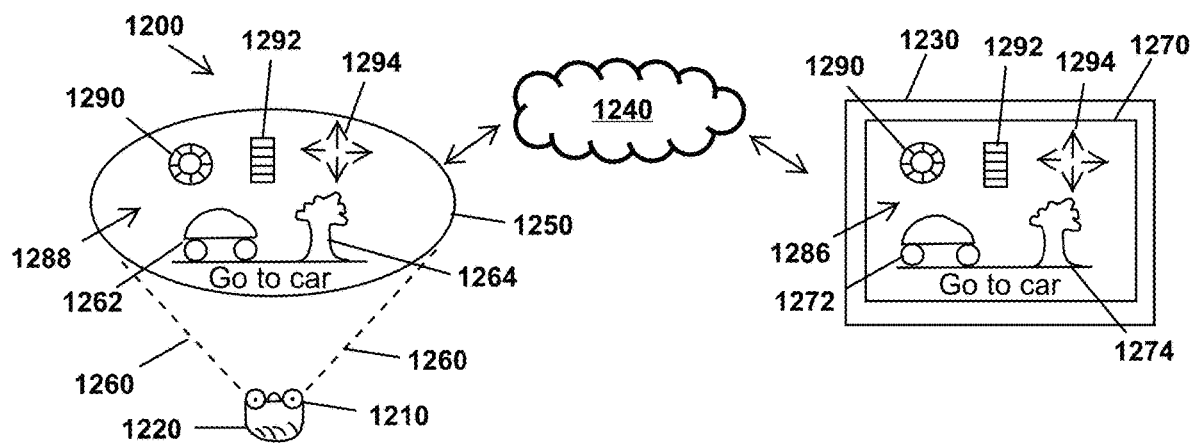

FIG. 12D illustrates the system 1200 in which the display 1270 of the HPED 1230 includes controls 1286 that provide instructions over the network 1240 to the wearable electronic device 1210 that projects or displays controls 1288 in the field of view 1250. The controls 1288 provided on the wearable electronic device 1210 can be similar to or different than the controls 1286 provided on the HPED 1230. For illustration purposes, the controls are shown as being similar on the HPED and the wearable electronic device.

By way of example, the controls 1286 include a head motion or head movement control 1290, a speed control 1292, and a direction control 1294. These controls are also shown as virtual objects or images in the field of view 1250 of the wearable electronic device 1210. The head movement control 1290 has a circular or doughnut shape with different sections. When a section is highlighted or activated, the user will move his head in the direction of this section. An activated section provides a user with instruction on which direction to turn or face his head. The speed control 1292 has a rectangular shape with different sections. When a section is highlighted or activated, the user can determine a speed at which to move. For instance, activation of the lower section indicates walk or move slowly; activation of half of the rectangle indicates walk quickly or jog slowly; and activation of the entire rectangle indicates move quickly or run. The direction control 1294 includes four arrows or pointers that point in different directions (such as pointing to zero degrees, ninety degrees, one hundred and eighty degrees, and two hundred and seventy degrees). When an arrow or pointer is highlighted or activated, the user will proceed or take action in this direction.

Consider an example in which a user of the HPED 1230 desires the user 1220 of the wearable electronic device 1210 to walk to the automobile 1262. The user of the HPED speaks a command or instruction (e.g., "Go to car"), and this instruction appears in the field of view 1250 of the wearable electronic device 1210. Further instructions are also provided, such as activation of the top arrow of the direction control 1294 so the user 1220 knows in which direction to proceed and activation of two lower sections of the speed control 1292 so the user knows to walk quickly toward the automobile. Once at the automobile, a left section of the head movement control 1290 activates so the user knows to turn his head to the left in a direction indicated with the activated section. Activation of the head, speed, and direction controls can be with verbal commands, gesticulations of a body, interaction with a GUI, etc.

Thus, the controls 1286 enable a user of one electronic device (e.g., the HPED 1230) to control or provide movement instructions to a user of another electronic device (e.g., the wearable electronic device 1210). For illustration purposes, the controls 1286 on the display 1270 of the HPED 1230 also appear in the field of view 1250 of the wearable electronic device 1210. These two control sets can be the same, similar, or different.

Figure 13A:
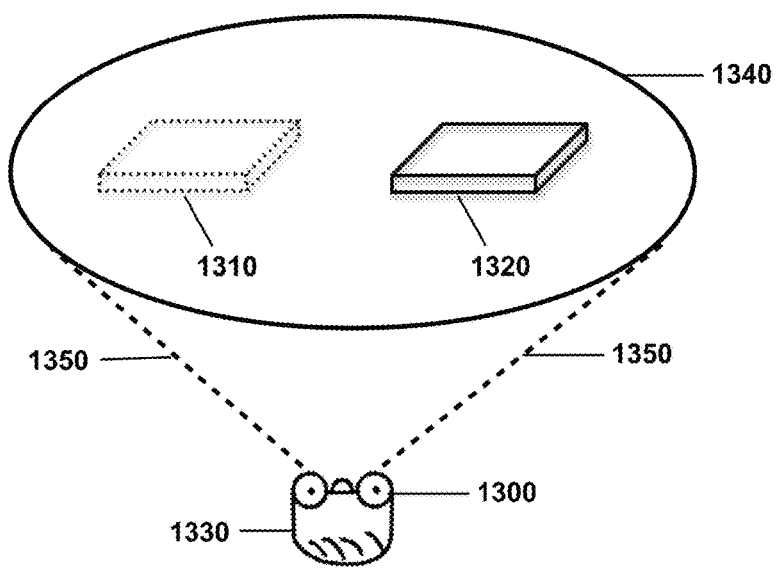
FIGS. 13A-13C show a wearable electronic device that provides a virtual object with a real object in accordance with an example embodiment.
Figure 13B:
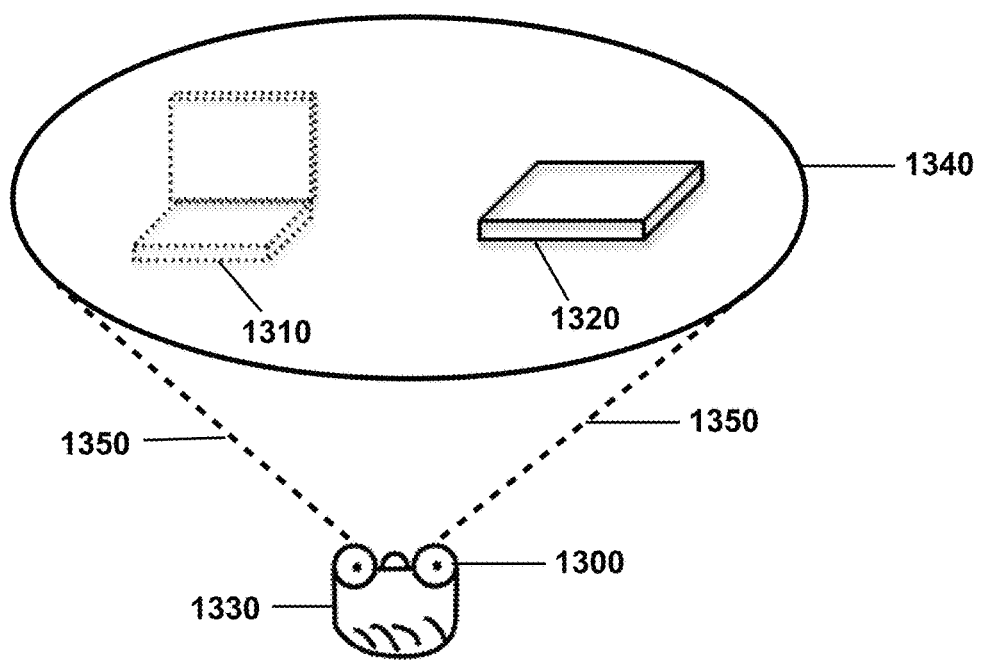
Figure 13C:
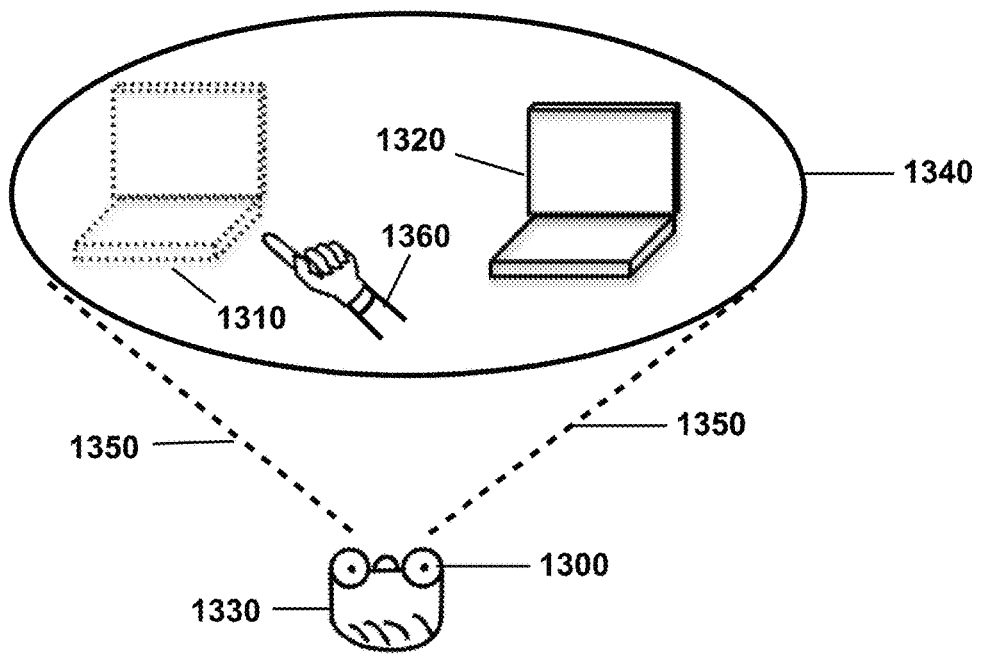

FIGS. 13A-13C show a wearable electronic device 1300 that provides a virtual object 1310 with a real object 1320. For illustration, a user 1330 wears the wearable electronic device 1300 (shown by way of example as electronic glasses or electronic eyewear). The user 1330 has a field of view 1340 through the wearable electronic device 1300 with a periphery, edge, or perimeter shown with dashed lines 1350.

The field of view 1340 of the user 1330 includes the real object 1320 (shown by way of example as a notebook computer in a closed state or open state) and the virtual object 1310 (shown as a virtual notebook computer in the closed state or open state). For illustration purposes, the virtual object 1310 (i.e., the virtual notebook computer) emulates or copies the real object 1320 (i.e., the real notebook computer). As such, the virtual object can look like or be similar to the real object. For instance, the virtual object appears as a same make and model notebook computer as the real notebook computer. Alternatively, the virtual object can be different than or dissimilar to the real object.

The virtual object 1310 is placed or positioned next to or adjacent to the real object 1320. As such, the user simultaneously sees the real object 1320 (which is physically and actually present in the real world in front of the user) and the virtual object 1310 (which is not physically present in front of the user but appears in front of the user as a virtual image or virtual object). The wearable electronic device 1300 presents, provides, displays, generates, or projects the virtual object 1310 to the field of view 1340 of the user 1330.

In FIGS. 13A-13C, the wearable electronic device 1300 uses the virtual object 1310 to provide the user with instructions or commands with regard to the real object 1320. For example, the virtual object 1310 moves to assist the user in operating the real object 1320.

Consider an example in which the user 1330 purchases a new notebook computer (shown as the real object 1320), but does not know how to operate this electronic device. The user requests instructions or assistance from the wearable electronic device 1300. In response to this request, the wearable electronic device 1300 produces a virtual image of the real notebook computer next to the real notebook computer. FIG. 13A shows both the notebook computer of the real object 1320 and the notebook computer of the virtual object 1310 in a closed state (i.e., the lid of the notebook computer is closed). Next, the wearable electronic device 1300 moves or opens the lid of the virtual notebook computer to illustrate this step or action for the user 1330 to take on the real notebook computer. FIG. 13B shows the notebook computer of the real object 1320 in the closed state with the notebook computer of the virtual object 1310 in an open state (i.e., the lid of the notebook computer is open). In response to this visual instruction or demonstration, the user 1330 emulates the action of the virtual notebook computer and opens the lid of the real notebook computer. The wearable electronic device 1300 detects movement of the lid and opening of this computer (i.e., detects the completion of the action of the user of opening the real notebook computer). Next, the wearable electronic device 1300 provides a virtual hand 1360 that takes an action on the virtual notebook computer (such as showing the user how to turn on or operate the notebook computer). FIG. 13C shows the notebook computer of the real object 1320 in the open state with the notebook computer of the virtual object 1310 receiving an action from the virtual hand 1360 of a user.

Example embodiments are not limited to the virtual image or virtual object being near or adjacent the real object. The virtual object can be included with or on the real object as well.

Figure 14:
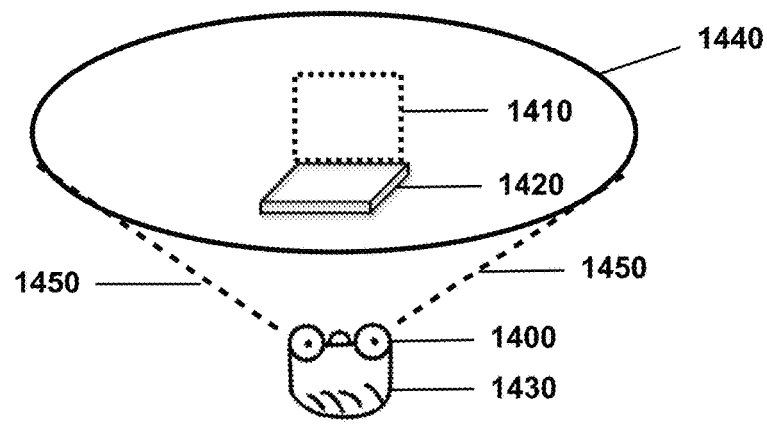
FIG. 14 shows a wearable electronic device that provides a virtual object located on a real object in accordance with an example embodiment.

FIG. 14 shows a wearable electronic device 1400 that provides a virtual object 1410 located on a real object 1420. For illustration, a user 1430 wears the wearable electronic device 1400 (shown by way of example as electronic glasses or electronic eyewear). The user 1430 has a field of view 1440 through the wearable electronic device 1400 with a periphery, edge, or perimeter shown with dashed lines 1450.

The virtual object 1410 is shown as a notebook computer with a lid in an open position. This notebook computer is superimposed on or over the real object 1420 that is a notebook computer with a lid in a closed position. A base of the virtual notebook computer is over or on the base of the real notebook computer and has a similar or same shape and size as the real notebook computer. Movement of the lid of the virtual notebook computer from the closed position to the open position visually illustrates or instructs the user to move the lid of the real notebook computer from the closed position to the open position. Movement of the lid of the real notebook computer places this lid in a position that coincides with a position of the lid of the virtual notebook computer. For example, the wearable electronic device places the virtual notebook computer over the real notebook computer and opens the lid of the virtual notebook computer. This action of opening the lid instructs the user to then open the lid of the real computer.

In an example embodiment, the virtual object can emulate the real object and have a same size and shape as the real object. For instance, if the real object is an electronic device, then the virtual object is a same make and model of electronic device. Alternatively, the virtual object can be different in size, shape, make, model, etc. from the real object.

In FIG. 14, the user 1430 raises the lid of the real notebook computer to coincide with a position of the lid of the virtual notebook computer. For instance, the user raises the lid until a position of the lid matches a position of the virtual lid. When the positions match or align, the user can visually see that the lid of the notebook computer was raised to the correct location, and this step was successfully and correctly completed.

Figure 15A:
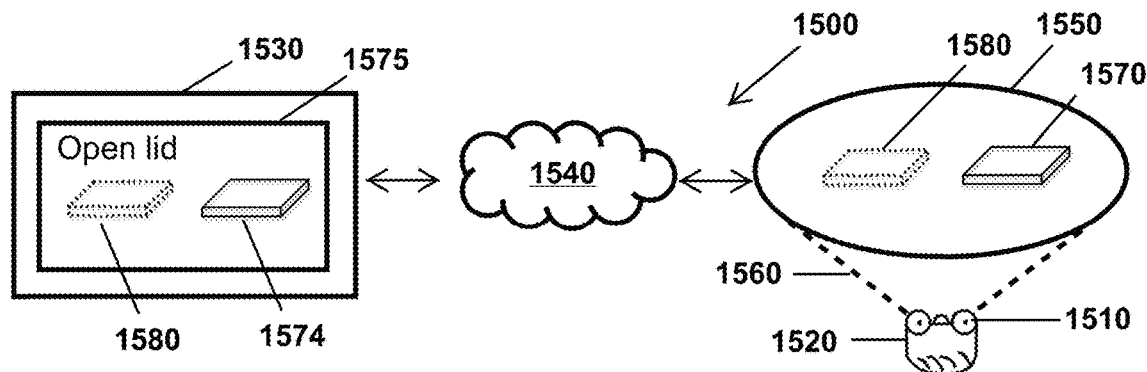
FIGS. 15A-15C show a computer system or electronic device system that provides instructions to a wearable electronic device in accordance with an example embodiment.
Figure 15B:
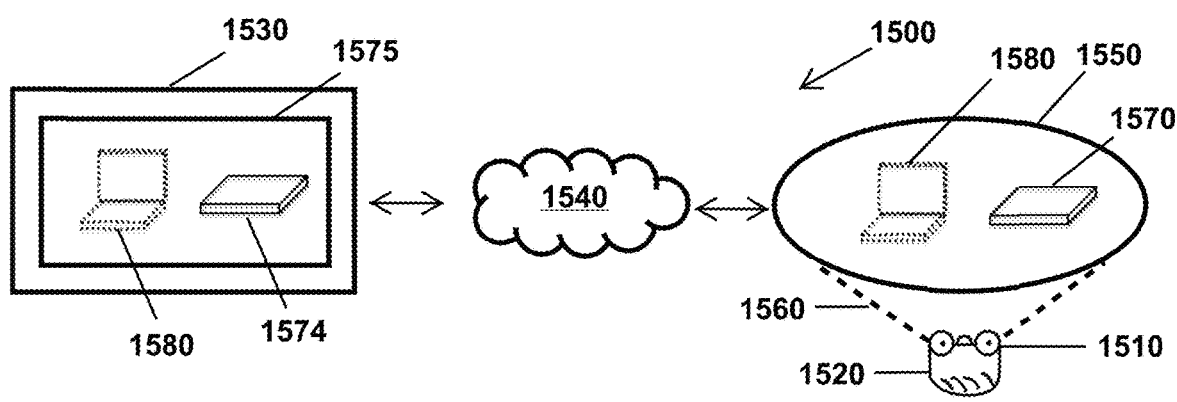
Figure 15C:
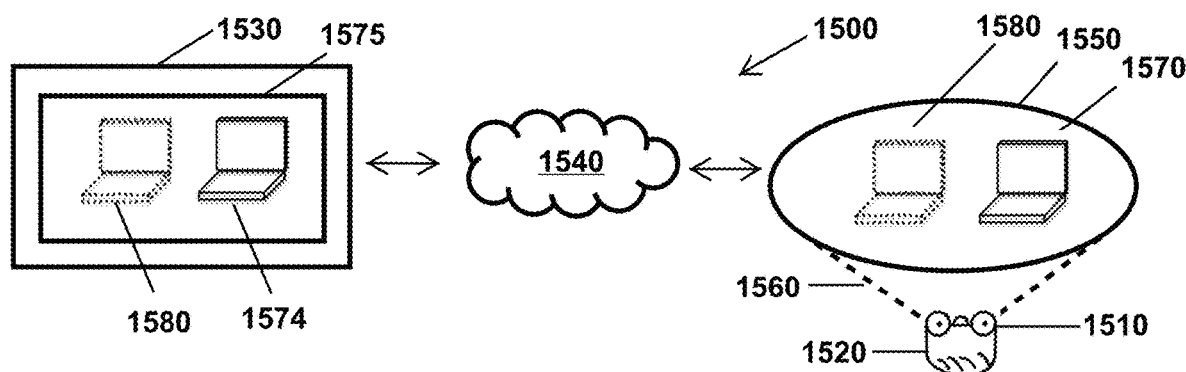

FIGS. 15A-15C show a computer system or electronic device system 1500 that provides instructions to a wearable electronic device. This system 1500 includes a wearable electronic device 1510 worn on a user 1520 and an electronic device 1530 (such as a HPED) that communicates with the wearable electronic device 1510 over a network 1540.

A field of view 1550 is visible through or with the wearable electronic device 1510. By way of illustration, this field of view 1550 has an elliptical shape to represent a view or field of focus of the user 1520 through electronic glasses. Dashed lines 1560 represent a perimeter, periphery, or edge of the field of view 1550.

FIG. 15A shows the user 1520 looking straight ahead with a field of view that includes a real object 1570 shown by way of example as a notebook computer. The wearable electronic device 1510 captures this image and transmits it through the network 1540 to a display 1575 of the HPED 1530. As such, a view of the field of view 1550 appears to the user 1520 through the wearable electronic device and also on the display 1575 of the HPED 1530. The display 1575 of the HPED 1530 includes this image as notebook computer 1574.

The display 1575 and the field of view 1550 also include a virtual object 1580 shown as a virtual image of the real notebook computer 1570. This virtual object 1580 can be manipulated, moved, or changed with the HPED 1530 to instruct actions with regard to the real object 1570. For example, a user of the HPED 1530 or program executing on or with the HPED instructs the user 1520 through the wearable electronic device 1530.

FIG. 15B shows the virtual object 1580 with its lid in an open position. For example, a user of the HPED 1530 interacts with the display 1575 or HPED to transition the lid or cover of the virtual notebook computer from a closed position to an open position. Actions on the virtual notebook computer at the HPED 1530 simultaneously and in real-time emulate on or reproduce to the virtual notebook computer shown in the field of view 1550. As the lid opens on the virtual notebook computer at the HPED 1530, the lid also opens on the virtual notebook computer at the wearable electronic device 1510. In response to this instruction shown on the virtual object 1580, the user 1520 raises and opens the lid of the real object 1570 (i.e., the real notebook computer).

FIG. 15C shows the real object 1570 with its lid in an open position. The user 1520 raises and opens the lid of the real notebook computer. Actions on the real notebook computer 1570 simultaneously and in real-time emulate on or reproduce to the image of the real notebook computer 1574 on the HPED 1530.

FIGS. 15A-15C show an example embodiment in which two persons located remotely from each other interact with electronic devices to provide instructions with how to operate, control, or use a real object.

Consider an example in which the user 1520 was unable to operate his notebook computer 1570 (or other type of object or electronic device). The user requests assistance from a technician who is remote from the user 1520. The technician views an image 1574 of the notebook computer 1570 and executes a virtual image 1580 to assist in instructing the user 1520. This virtual image appears to both the technician and the user 1520. The technician manipulates the virtual image 1580 appearing on the HPED 1530 in order to provide instructions to the user on how to operate the real notebook computer 1570. Instructions from the technician appear as visualizations (such as text or indicia) or movements on or with the virtual object 1580. When the user takes an action on the notebook computer 1570, these actions are reproduced on the image 1574 at the HPED so the technician can see that the correct actions were taken. Alternatively, the HPED 1530 and/or a software program confirms that the actions of the user on the real notebook computer 1570 coincide with the instructions shown with the virtual object 1580.

Figure 16A:
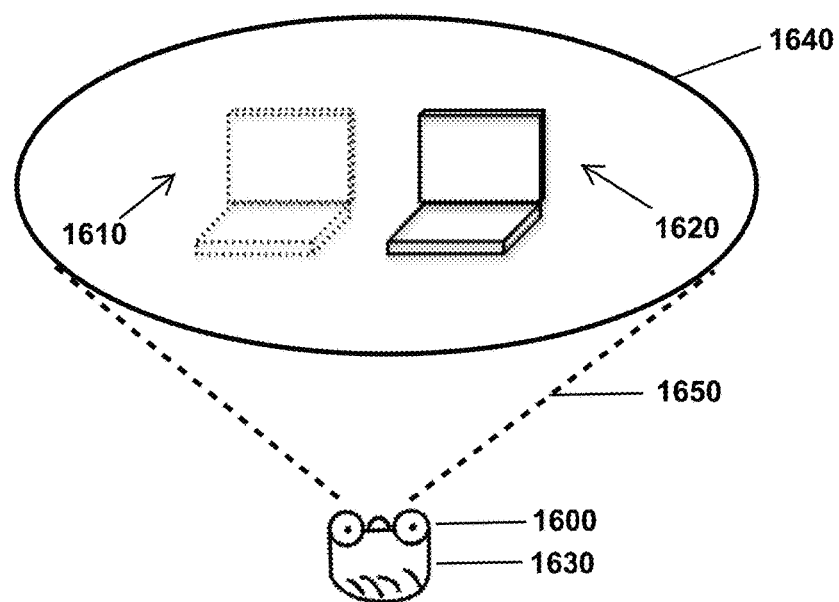
FIGS. 16A-16C show a wearable electronic device that provides a virtual object with a real object in accordance with an example embodiment.
Figure 16B:
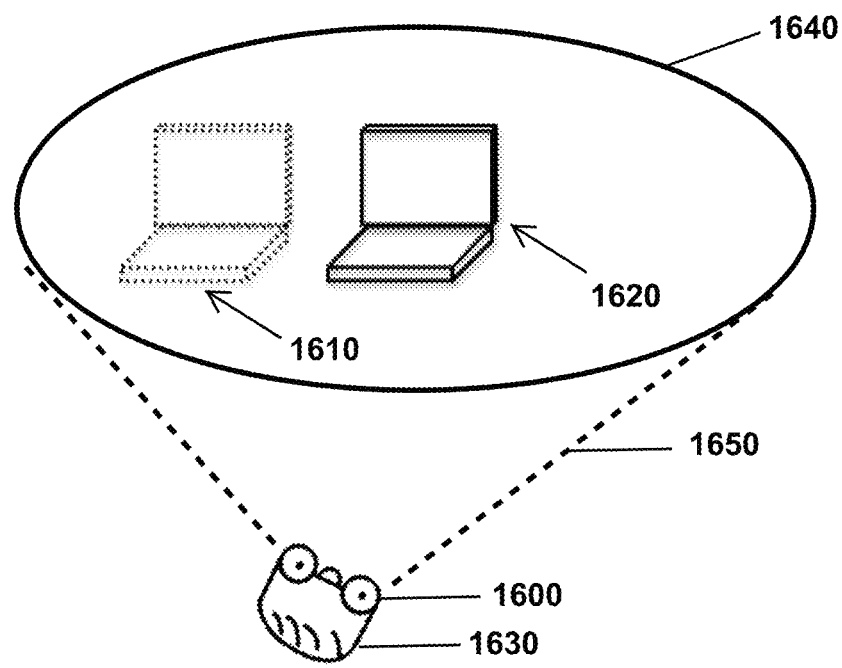
Figure 16C:
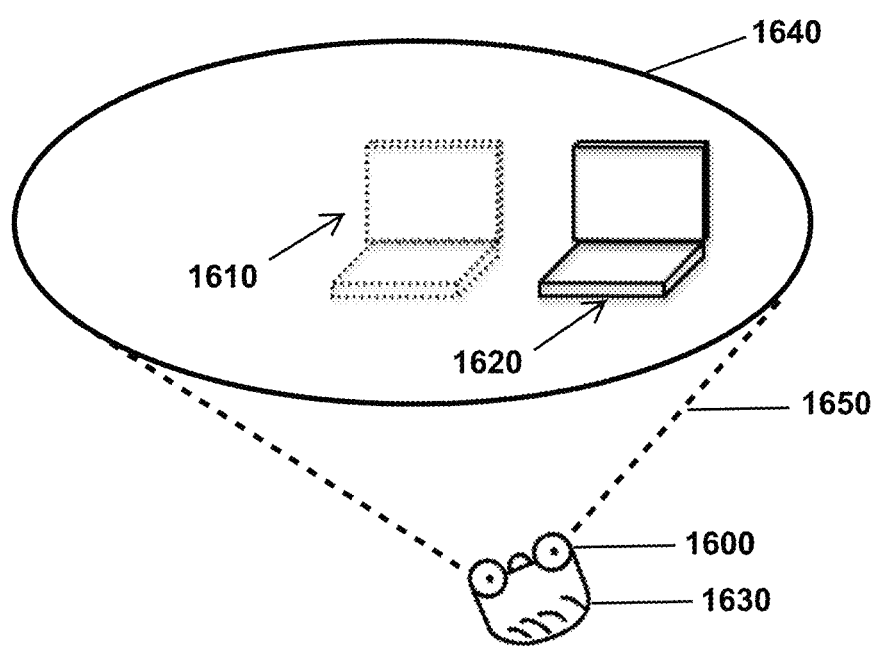

FIGS. 16A-16C show a wearable electronic device 1600 that provides a virtual object 1610 with a real object 1620. For illustration, a user 1630 wears the wearable electronic device 1600 (shown by way of example as electronic glasses or electronic eyewear). The user 1630 has a field of view 1640 through the wearable electronic device 1600 with a periphery, edge, or perimeter shown with dashed lines 1650.

The field of view 1640 of the user 1630 includes the real object 1620 (shown by way of example as a notebook computer in an open state) and the virtual object 1610 (shown as a virtual notebook computer in the open state). For illustration purposes, the virtual object 1610 (i.e., the virtual notebook computer) emulates or copies the real object 1620 (i.e., the real notebook computer). As such, the virtual object can look like or be similar to the real object. For instance, the virtual object appears as a same make and model notebook computer as the real notebook computer. Alternatively, the virtual object can be different than or dissimilar to the real object.

The virtual object 1610 is placed or positioned on, with, over, next to, or adjacent to the real object 1620 and maintains a consistent position with respect to the real object 1620 while the user 1630 moves his head and changes the field of view 1640. For instance, when the user jiggles or moves his head, spacing between the virtual object 1610 and the real object 1620 remains constant. Additionally, when the user jiggles or moves his head, the virtual object 1610 does not appear to move with respect to the real object 1620. Both the real object 1620 and the virtual object 1610 remain stationary while the head 1630 of the user moves in different directions.

FIG. 16A illustrates the user 1630 looking straight toward the real object 1620 and the virtual object 1610. From a point of view of the user, the virtual object 1610 is next to on a left side of the real object 1620.

FIG. 16B illustrates the user 1630 looking toward his right side but still maintaining the real object 1620 and the virtual object 1610 in his field of view 1640. As the user 1630 moves his head toward his right side, the field of view 1640 also moves to this side. During this movement, the wearable electronic device 1600 simultaneously compensates and moves a position of the virtual object 1610 being displayed to the user. Movement of the virtual object 1610 coincides with and negates movement of the wearable electronic device 1600 such that the virtual object 1610 appears to remain motionless or still with respect to the real object. For instance, as the user 1630 moves his head toward his right side, the virtual object 1610 simultaneously moves with a same speed toward the opposite side of the field of view 1640. In other words, the virtual object 1610 moves in an opposite direction but with a same speed as movement of the field of view 1640. This offsetting motion enables the virtual object 1610 to appear to remain still while the field of view 1640 changes.

FIG. 16C illustrates the user 1630 looking toward his left side but still maintaining the real object 1620 and the virtual object 1610 in his field of view 1640. As the user 1630 moves his head toward his left side, the field of view 1640 also moves to this side. During this movement, the wearable electronic device 1600 simultaneously compensates and moves a position of the virtual object 1610 being displayed to the user. Movement of the virtual object 1610 coincides with and negates movement of the wearable electronic device 1600 such that the virtual object 1610 appears to remain motionless or still with respect to the real object. For instance, as the user 1630 moves his head toward his left side, the virtual object 1610 simultaneously moves with a same speed but opposite direction toward the right side of the field of view 1640.

FIGS. 16A-16C illustrate that as the user moves his head in different directions, the virtual object simultaneously moves to compensate and offset this movement such that the virtual object maintains a consistent position with respect to the real object.

Consider an example in which the wearable electronic device of the user executes instructions that assist the user in solving a problem with another electronic device that sits on a table in front of the user. While the user looks at this electronic device, a virtual image of this electronic device appears to sit on the table next to the real electronic device. These two objects are situated in a center of the field of view of the user. The virtual object then begins to move and/or otherwise instruct the user about this electronic device. During this instruction, the user moves his head and looks away (such as looking to his side). During this movement, the real electronic device does not move since it remains stationary on the table. Likewise, the virtual image of the electronic device also appears to remain stationary on the table next to the real electronic device. In order to make this appearance, the wearable electronic device changes a position on its lens or display of the virtual image of the electronic device. In other words, a projection, image, or location of the virtual electronic device changes on the display or lens in order to compensate for the movement of the field of view of the user. This change corresponds to the movement of the field of view such that the virtual image appears to remain stationary with respect to the real object while both objects simultaneously remain in the field of view.

A consistent distance can also be maintained between the virtual and real objects while the real object moves in the field of view of the user. For example, while the virtual object is positioned next to the real object, a wearer of the wearable electronic device picks up the real object and moves it to another location in the field of view. In response to this motion, the virtual object simultaneously moves to appear to maintain a consistent distance with the real object. Thus the virtual object tracks or follows the movements of the real object so the virtual object remains positioned next to the real object. These two objects move together in conjunction or in tandem.

FIGS. 17A-17D show a wearable electronic device 1700 that provides a virtual object 1710 with a real object 1720. For illustration, a user 1730 wears the wearable electronic device 1700 (shown by way of example as electronic glasses or electronic eyewear). The user 1730 has a field of view 1740 through the wearable electronic device 1700 with a periphery, edge, or perimeter shown with dashed lines 1750.

The field of view 1740 of the user 1730 includes the real object 1720 (shown by way of example as a notebook computer in an open state) and the virtual object 1710 (shown as a virtual notebook computer in the open state). For illustration purposes, the virtual object 1710 (i.e., the virtual notebook computer) emulates or copies the real object 1720 (i.e., the real notebook computer). As such, the virtual object can look like or be similar to the real object. For instance, the virtual object appears as a same make and model notebook computer as the real notebook computer. Alternatively, the virtual object can be different than or dissimilar to the real object.

The virtual object 1710 is placed or positioned on, with, over, next to, or adjacent to the real object 1720 and moves to different positions with respect to the real object 1720 to stay within the field of view 1740 while the user 1730 moves his head and changes the field of view 1740. For instance, when the user moves his head, this movement can cause a location of the virtual object 1710 to be out of the field of view 1740 and hence no longer visible to the user 1730. In response to this movement, a position of the virtual object 1710 in the field of view 1740 changes in order to maintain the virtual object in the field of view 1740 and with the real object 1720.

The virtual object 1710 transitions or moves to a new location within the field of view 1740 when movement of the wearable electronic device 1700 causes the virtual object 1710 to no longer be visible or present within the field of view 1740. For example, when the user 1730 moves his head to one side, this movement can cause a current location of the virtual object 1710 to be out of the field of view 1740 while the real object 1720 remains in the field of view 1740. To compensate or adjust for this movement, a position or location of the virtual object 1710 in the field of view 1740 changes so the virtual object 1710 remains in the field of view 1740 and with or on the real object 1720.

In an example embodiment, spacing between the virtual object 1710 and the real object 1720 remains constant or unchanged until a view of the virtual object 1710 becomes obstructed or until movement of the field of view is significant enough to remove the virtual object 1710 or a portion of the virtual object 1710 from the field of view. For example, when the user jiggles or slightly moves his head to one side, the virtual object does 1710 does not appear to move with respect to the real object 1720 if both the virtual object 1710 and the real object 1720 remain unobstructed or in the field of view 1740.

Both the real object 1720 and the virtual object 1710 remain stationary while the head 1730 of the user moves in different directions with slight movements. When these movements, however, are significant enough to impede or restrict a view of the virtual object 1710 (such as pushing the virtual object 1710 or portions thereof out of the field of view 1740), the virtual object 1710 is repositioned within the field of view 1740 to remain visible to the user 1730. Additionally, the virtual object 1710 is repositioned within the field of view 1740 when its view is obstructed. For example, while the virtual and real objects are within the field of view, another object impedes, restricts, or obstructs the user's view of the virtual object. In this instance, the virtual object is repositioned within the field of view to provide the user with a clear or unobstructed view of the virtual object. As another example, the virtual object is repositioned in the field of view when an edge or perimeter of the field of view hits or touches the virtual object.

Figure 17A:
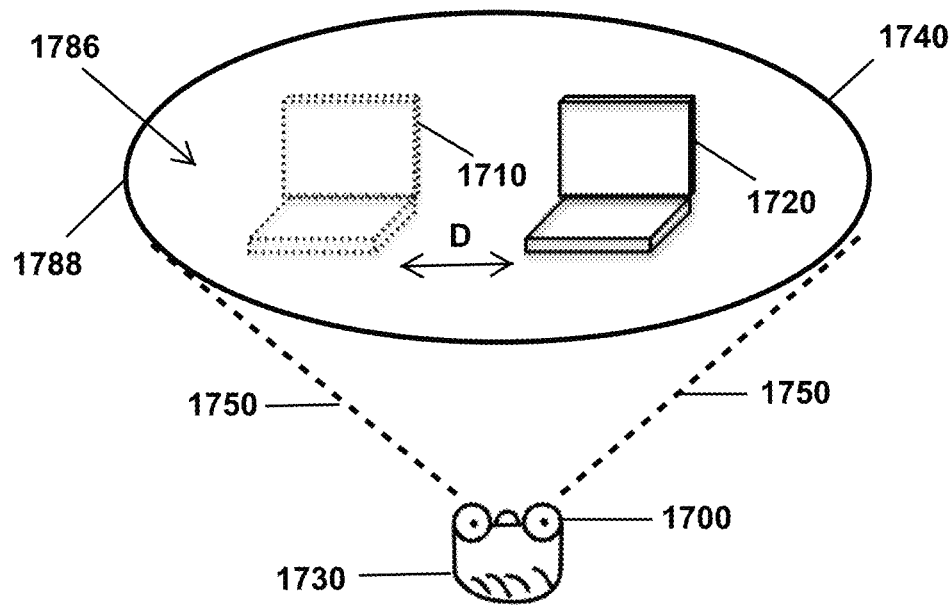
FIGS. 17A-17D show a wearable electronic device that provides a virtual object with a real object in accordance with an example embodiment.

FIG. 17A illustrates the user 1730 looking straight toward the real object 1720 and the virtual object 1710. From a point of view of the user, the virtual object 1710 is next to and on a left side of the real object 1720.

Figure 17B:
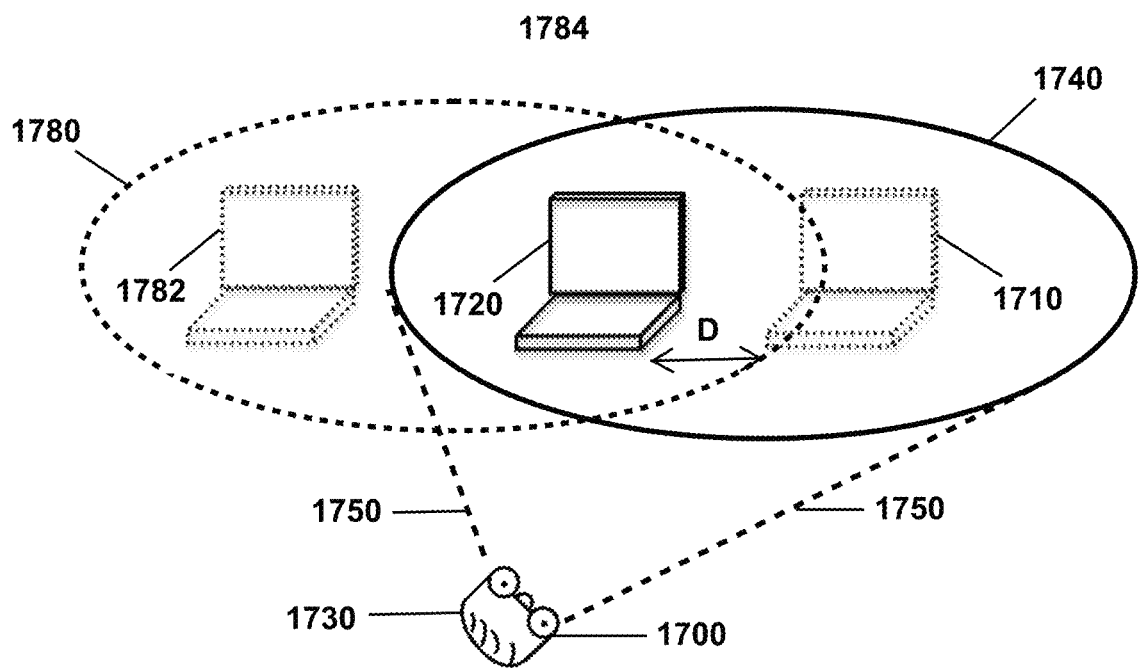

FIG. 17B illustrates the user 1730 looking toward his right side but still maintaining the real object 1720 in his field of view 1740. If a position of the virtual object 1710 were not moved, then the virtual object 1710 would no longer remain in the field of view of the user. The position of the field of view from FIG. 17A is shown with dashed lines 1780, and the position of the virtual object from FIG. 17A is shown with dashed lines 1782. If the virtual object did not move with respect to the real object 1720, then the virtual object would no longer be in the field of view 1740 of the user shown in FIG. 17B. Arrow 1784 shows that the virtual object 1710 moved from its previous position 1782 in the field of view to a different position in the field of view. Specifically, the virtual object 1710 went from being positioned on a left side of the real object (shown in FIG. 17A) to being positioned on a right side of the real object (shown in FIG. 17B).

While the virtual object moves to different positions within the field of view or different positions with respect to the real object, a distance between the virtual object and real object remains consistent. For example, FIG. 17A shows a distance D exists between the virtual object 1710 and the real object 1720 while the virtual object is positioned on a left side of the real object. In response to the user 1730 moving his head to his right, the virtual object 1710 moves or switches to a new location with respect to the real object. FIG. 17B shows the virtual object 1710 moved to a different location with respect to the real object 1720 (the virtual object is now positioned on a right side of the real object). A relative distance between the virtual object and the real object did not change after the virtual object moved or switched to a different location. FIG. 17B shows a distance D exists between the virtual object 1710 and the real object (an equivalent distance D shown in FIG. 17A).

Figure 17C:
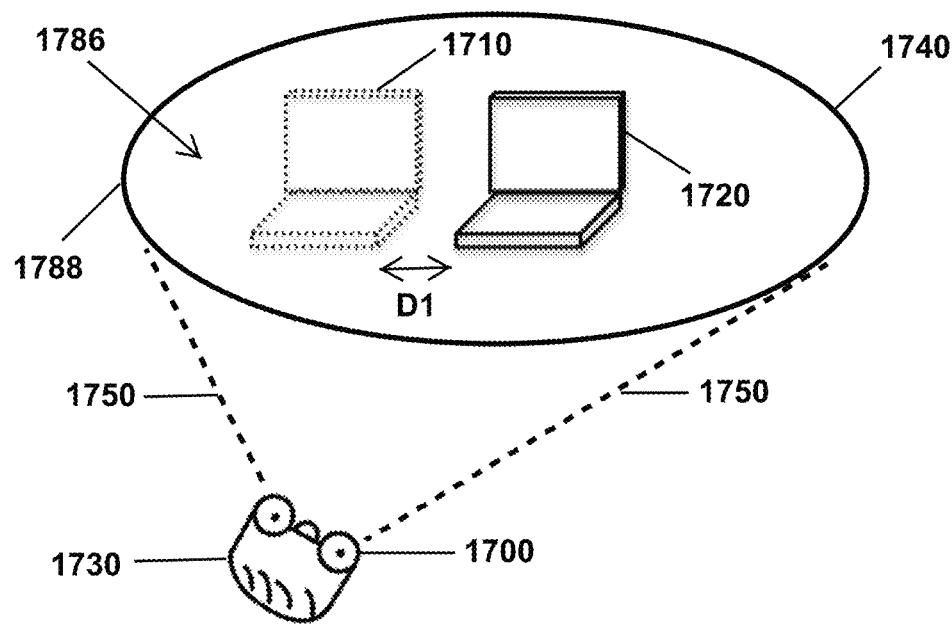

FIGS. 17A and 17C illustrate that a distance between the virtual object and the real object can vary or change in response to movement of the wearable electronic device. FIG. 17A shows a distance D between the virtual object 1710 and the real object 1720. FIG. 17C shows a distance D1 between the virtual object 1710 and the real object 1720 in which D1 is less than D.

As the user 1730 moves his head toward his right, an amount of available space 1786 between the virtual object 1710 and edge or side 1788 of the field of view 1740 reduces or lessens. The virtual object 1710 can remain in this space 1786 and to the left of the real object 1720 as long as the available space 1786 is large enough or sufficient enough in shape and/or size to accommodate a shape and/or size of the virtual object 1710. When the size and/or shape of this available space 1786 is not sufficient, then the virtual object 1710 moves to a new location in the field of view. For example, the virtual object 1710 moves closer to the real object 1720, and this movement reduces a distance between the virtual object and the real object. Moving closer to the real object increases the available space 1786 by reducing the distance between the virtual object and the real object. This movement also causes the virtual object to move farther away from edge 1788. As shown in FIGS. 17A and 17C, the distance D1 is less than the distance D since the virtual object 1710 moved closer to the real object 1720 to compensate for movement of the wearable electronic device 1700 and corresponding reduction in available space 1786 for the virtual object to exist at its current location with respect to the real object.

Figure 17D:
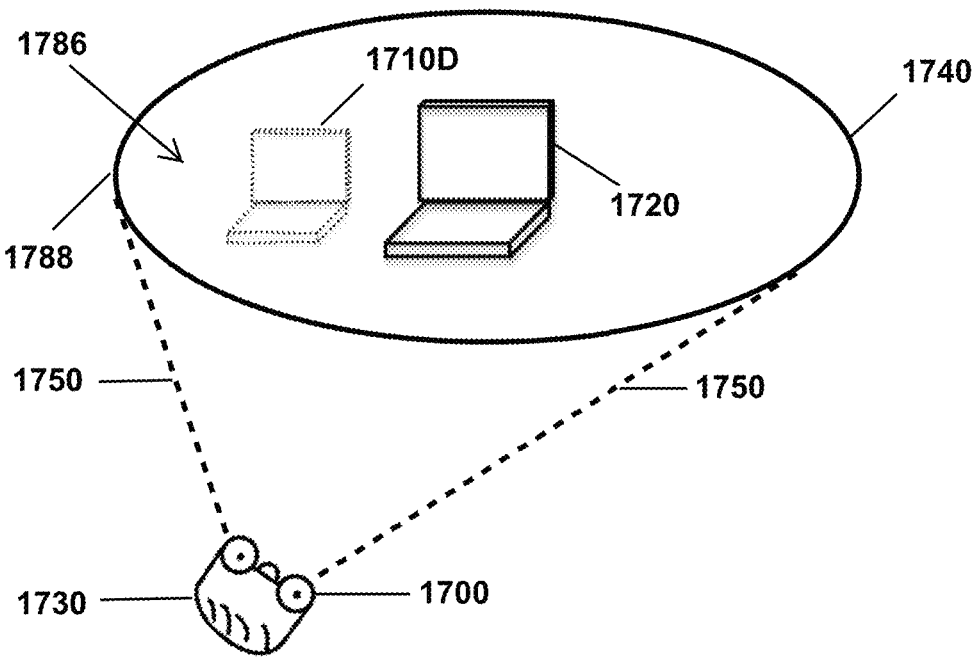

FIGS. 17A and 17D illustrate that a size and/or shape of the virtual object can vary or change in response to movement of the wearable electronic device. FIG. 17A shows the virtual object 1710 and the real object 1720 having a similar or equivalent size and shape. FIG. 17D shows the virtual object 1710D having a reduced size in comparison to the virtual object 1710 shown in FIG. 17A.

As the user 1730 moves his head toward his right, an amount of available space 1786 between the virtual object 1710 and edge or side 1788 of the field of view 1740 reduces or lessens. The virtual object 1710 can remain in this space 1786 and to the left of the real object 1720 as long as the available space 1786 is large enough or sufficient enough in shape and/or size to accommodate a shape and/or size of the virtual object 1710. When the size and/or shape of this available space 1786 are not sufficient, then the virtual object 1710 changes its size and/or shape to compensate for the reduction in size of available space 1786. For example, the virtual object becomes smaller as the edge 1788 impinges on or approaches a boundary of the virtual object. Reducing a size and/or changing a shape of the virtual object increases the available space 1786 by reducing an amount of space needed or required to maintain the virtual object at its current location. As shown in FIGS. 17A and 17D, a size of the virtual object 1710 in FIG. 17A is greater than a size of the virtual object 1710D in FIG. 17D. This reduction in size compensates for movement of the wearable electronic device 1700 and corresponding reduction in available space for the virtual object to exist at its current location with respect to the real object.

As the user moves his head or a position of the wearable electronic device changes, a size of the virtual object, a shape of the virtual object, and/or a distance between the virtual object and the real object changes or adjusts to offset or accommodate the movement of the head or wearable electronic device. Such adjustments enable the virtual object to remain in a steady or consistent position with respect to the real object in spite of movement to the field of view.

To compensate or correct for such movement, the virtual object can also changes its orientation and/or its view. For example, if the virtual object exists as a 3D image, then the virtual object rotates about one of its axes (such as rotating about one or more of an x-axis, a y-axis, or a z-axis). As another example, the virtual object changes from being presented as a 3D object to being presented as a 2D object. As yet another example, the virtual object changes its view to the user (such as changing from being presented in a perspective view to being presented in a plan view).

Consider an example in which the wearable electronic device moves, and this movement causes an edge of the field of view to touch or overlap on the virtual object. Without an adjustment to the virtual object, a portion of the virtual object is no longer visible to the user. In response to this movement, a distance between the virtual object and the real object decreases. This distance can decrease to zero. If the edge of the field of view continues to impinge or cover the virtual object after the distance is zero (i.e., the virtual and real object are right next to each other with little or no space between them), then the virtual object can continue to move to a position that is over or superimposed on top of the real object (for example, see FIG. 14).

Figure 18A:
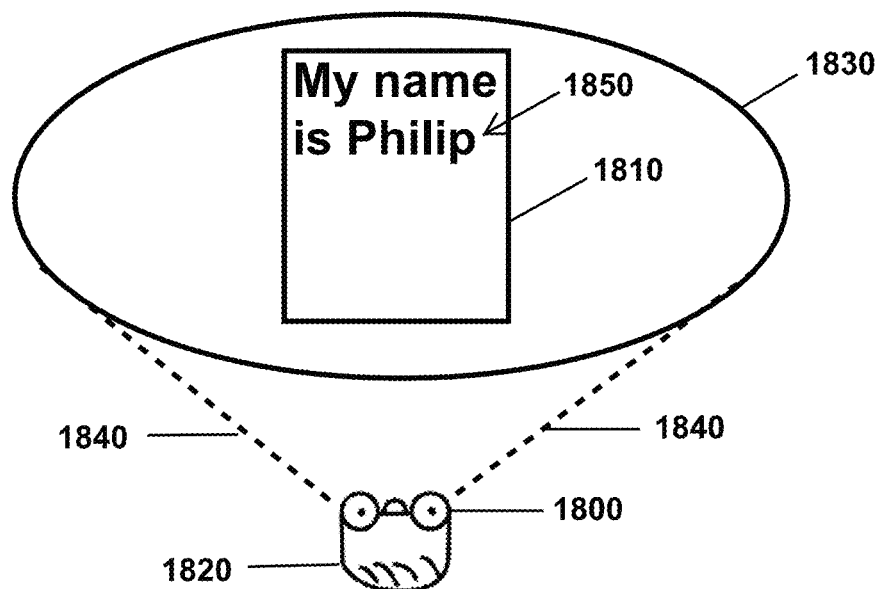
FIGS. 18A-18C show a wearable electronic device that translates writing on a real object in accordance with an example embodiment.
Figure 18B:
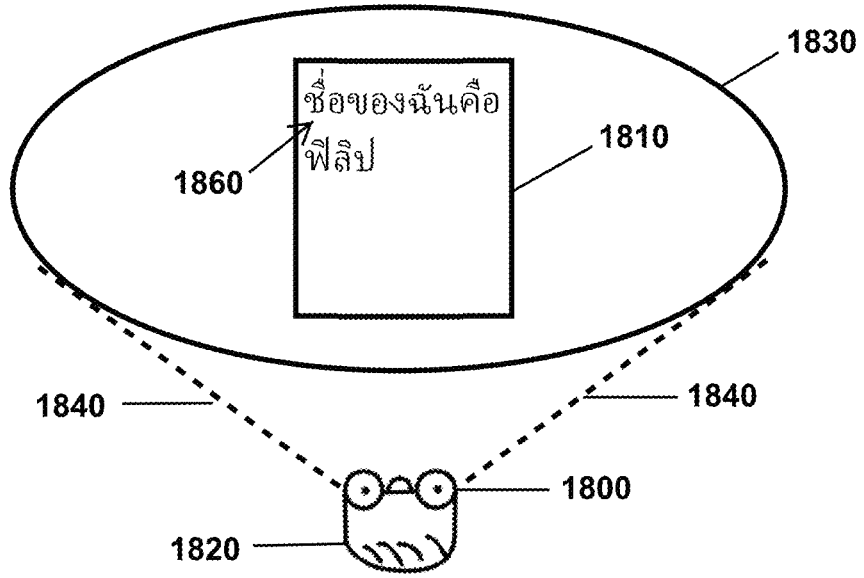
Figure 18C:
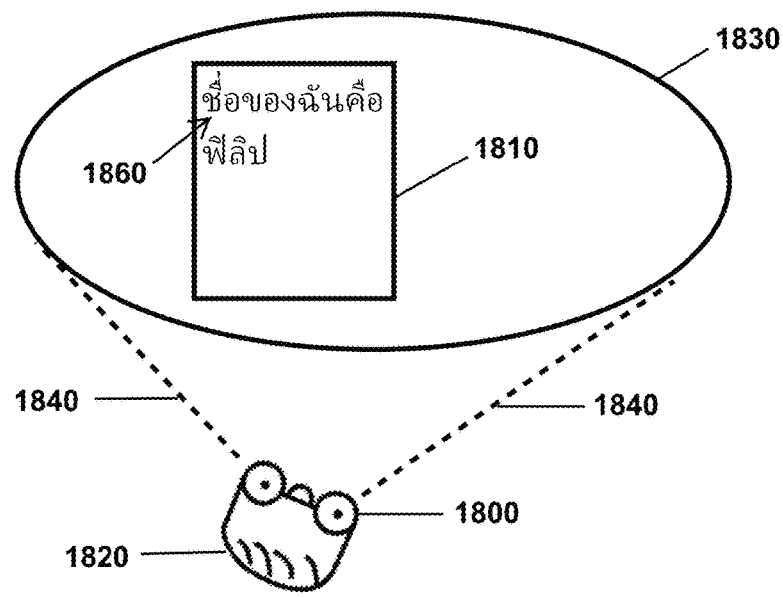

FIGS. 18A-18C show a wearable electronic device 1800 that translates writing on a real object 1810. For illustration, a user 1820 wears the wearable electronic device 1800 (shown by way of example as electronic glasses or electronic eyewear). The user 1820 has a field of view 1830 through the wearable electronic device 1800 with a periphery, edge, or perimeter shown with dashed lines 1840.

The real object 1810 includes one side with text or writing 1850 (shown as writing in English that says "My name is Philip"). The user views this writing in its original language (i.e., English) on the real object 1810.

FIG. 18B shows a virtual object 1860 superimposed over the writing 1850 on the real object 1810. This virtual object 1860 is a translation of the writing in the English language to Thai language (shown as a translation in Thai of the English phrase "My name is Philip"). The virtual object 1860 of the Thai language is on or over the original writing in English such that the real object 1810 appears to the user 1820 through the wearable electronic device 1800 to be written in Thai, not English.

FIG. 18C shows the virtual object 1860 superimposed over writing on the real object 1810 as the user 1820 moves his head. As the user 1820 moves his head in different directions, the virtual object 1860 remains stationary on the real object 1810 such that the writing on the real object appears to be in Thai to the user. As shown in FIG. 18C, the user 1820 moves his head to his right side, yet the translation of the English writing to Thai remains on the real object.

Figure 19:
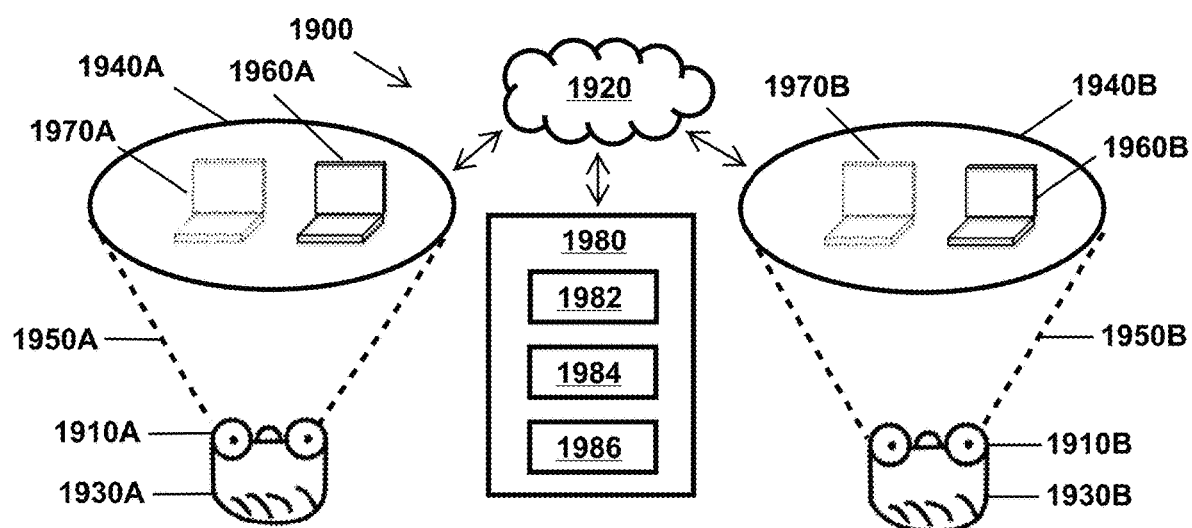
FIG. 19 shows a computer system or electronic device system that includes wearable electronic devices that communicate with each other over a network in accordance with an example embodiment.

FIG. 19 shows a computer system or electronic device system 1900 that includes wearable electronic devices 1910A and 1910B that communicate with each other over a network 1920. For illustration, a user 1930A wears the wearable electronic device 1910A, and a user 1930B wears the wearable electronic device 1910B (both devices shown by way of example as electronic glasses or electronic eyewear). Users 1930A and 1930B have respective fields of view 1940A and 1940B with respective peripheries, edges, or perimeters shown with dashed lines 1950A and 1950B.

The field of view 1940B of user 1930B includes a real object 1960B, and the field of view 1940A of user 1930A includes an image of the real object 1960A (such as a photo or a video of the real object 1960B). This image of the real object 1960A appears to the user 1930A in real time as the wearable electronic device 1910B captures this image. The field of view 1940B of user 1930B also includes a virtual object 1970B, and the field of view 1940A of user 1930A also includes a virtual object 1970A. For illustration, the real object 1960B and the image of the real object 1960A are shown as a notebook computer, and the virtual objects 1970A and 1970B are shown as virtual images of the notebook computer.

The wearable electronic devices 1910A and 1910B communicate over the network 1920 with other electronic devices 1980 (such as one or more servers). These electronic devices 1980 include one or more of processors 1982, memories 1984, a modeling and diagnosis system 1986, and other components discussed herein.

Actions on or movements of the virtual object 1970A simultaneously occur as actions on or movements of the virtual object 1970B. For example, when a manipulation occurs on the virtual object 1970A shown to user 1930A, this manipulation simultaneously occurs on the virtual object 1970B shown to user 1930B.

Consider an example in which user 1930B has a software issue or problem with his notebook computer 1960B and seeks assistance in resolving this issue or problem from user 1930A. User 1930B views his notebook computer 1960B with his wearable electronic device 1910B, and a real time video image of his notebook computer appears to user 1930A as the notebook computer 1960A. Computer software (such as programs and applications) executing on the notebook computer 1960B appear as virtual executions or simulations on the virtual notebook computer 1970A. As such, user 1930A has a view of the real notebook computer 1960A and a view of a virtual notebook computer 1970A that emulates or simulates the real notebook computer 1960B (including emulation or simulation of hardware, software, system state, etc.). For example, the virtual notebook computer 1970A uses the modeling and diagnosis system 1986 to replicate a current state of the real notebook computer 1960B. The user 1930A performs physical manipulations or actions on or to the virtual notebook computer 1970A, and these manipulations or actions replicate on the virtual notebook computer 1970B shown to user 1930B. In this manner, the user 1930B can see with the wearable electronic device 1910B what instructions or actions the user 1930A desires the user 1930B to perform on the real notebook computer 1960B. When the user 1930B performs the instructions or actions, the user 1930A sees this performance on the image of the notebook computer 1960A and/or the virtual notebook computer 1970A.

Consider the example above in which user 1930B has a software issue or problem with his notebook computer 1960B and seeks assistance in resolving this issue or problem from user 1930A. User 1930A uses a mouse or keyboard to provide instructions by navigating a cursor that appears on the display of virtual notebook computer 1970A. Navigation of this cursor also appears on the virtual notebook computer 1970B. The user 1930B, wearable electronic device 1910B, or a software program then executes these instructions on the real notebook computer 1960B (such as a software program automatically executing the instructions on the real notebook computer 1960B or the user 1930B interacting with his mouse or keyboard to emulate navigation of his cursor to match the instructions received from user 1930A).

Consider the example above in which user 1930B has a software issue or problem with his notebook computer 1960B and seeks assistance in resolving this issue or problem from user 1930A. User 1930A types into his keyboard and performs a series of commands that execute on the virtual notebook computer 1970A. The virtual notebook computer 1970A emulates software, hardware, and current state information on the real notebook computer 1960B. These commands appear to resolve the issue or problem on the virtual notebook computer 1970A so the user 1930A authorizes these commands to execute on the real notebook computer 1960B. User 1930A watches the real notebook computer 1960A and visually verifies that the commands resolved the issue or problem. The user 1930A was thus able to resolve the issue with the virtual notebook computer 1970A and then see the problem being cured on the real notebook computer 1960B (i.e., image 1960A presents the user 1930A with a real-time view of the real notebook computer 1960B).

Consider the example above in which user 1930B has a software issue or problem with his notebook computer 1960B and seeks assistance in resolving this issue or problem from user 1930A. User 1930A instructs user 1930B to simultaneously hit or press the command-option-esc buttons on the keyboard of the real notebook computer 1960B. User 1930B, however, is unsure where these buttons exist on his keyboard and requests further assistance. In response to this request, user 1930A reaches his hand into the field of view 1940A and points to and/or presses the command-option-esc buttons on the virtual notebook computer 1970A. A virtual image of the user's hand appears in the field of view 1940B, and user 1930B sees the hand of user 1930A hitting the command-option-esc buttons on the virtual notebook computer 1970B. After seeing this demonstration, user 1930B knows the location of these buttons and presses the command-option-esc buttons on the real notebook computer 1960B.

Figure 20:
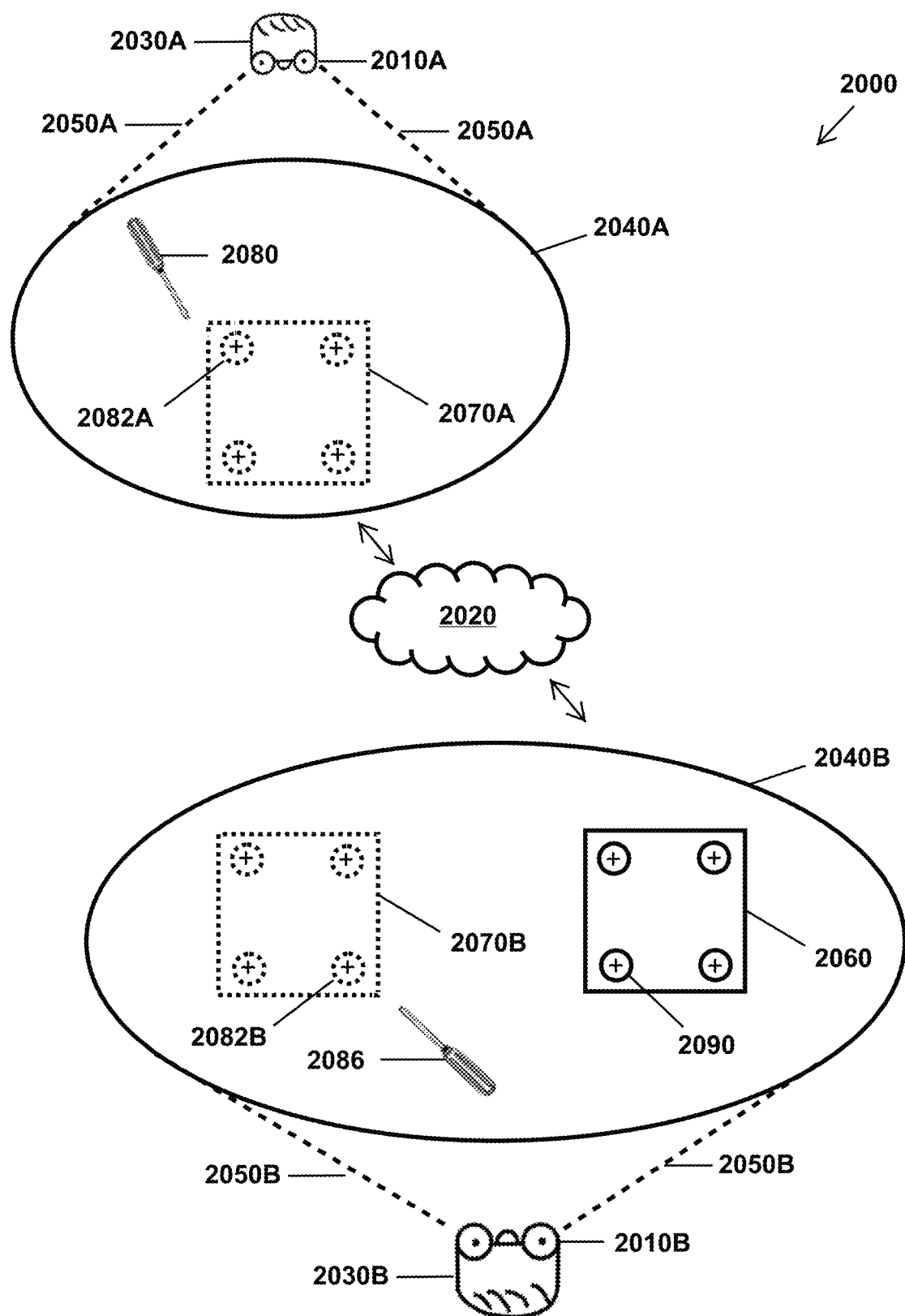
FIG. 20 shows a computer system or electronic device system that includes wearable electronic devices that communicate with each other over a network in accordance with an example embodiment.

FIG. 20 shows a computer system or electronic device system 2000 that includes wearable electronic devices 2010A and 2010B that communicate with each other over a network 2020. For illustration, a user 2030A wears the wearable electronic device 2010A, and a user 2030B wears the wearable electronic device 2010B (both devices are shown by way of example as electronic glasses or electronic eyewear). Users 2030A and 2030B have respective fields of view 2040A and 2040B with respective peripheries, edges, or perimeters shown with dashed lines 2050A and 2050B.

The field of view 2040B of user 2030B includes a real object 2060 and a virtual object 2070B, and the field of view 2040A of user 2030A includes a virtual object 2070A. The virtual objects 2070A and 2070B are virtual images or copies of the real object 2060. For illustration, the real object 2060 is shown as a plate or cover with four screws, and the virtual objects 2070A and 2070B are virtual images of this plate or cover.

Actions on or movements of the virtual object 2070A simultaneously occur as actions on or movements of the virtual object 2070B. These actions or movements on the virtual object 2070B provide assistance or instructions to the user 2030B on how to manipulate or act on the real object 2060.

Consider an example in which the user 2030A assists the user 2030B at a remote location in removing screws from the real cover 2060. User 2030A grabs a screwdriver 2080 (which is a real object) and moves this screwdriver toward a point in space where a virtual screw 2082A appears on the virtual cover 2070A in his field of view 2040A. Simultaneously, a virtual image of the screwdriver 2086 appears moving toward a point in space where a virtual screw 2082B appears on the virtual cover 2070B in the field of view 2040B of user 2030B (the hand and arm of user 2030A holding the screwdriver can also appear in the field of view 2040B but are emitted for ease of illustration). In response to this visualization, user 2030B grabs a real screwdriver (not shown) and engages it with the real screw 2090 on the real cover 2060.

Consider the example in which the user 2030A assists the user 2030B at a remote location in removing screws from the real cover 2060. When the user 2030A moves the screwdriver 2080 to the location in space of the virtual screw 2082A, the virtual screw 2082A visually changes or an indication is provided in order to signify its selection. For example, the virtual screw 2082A changes color, becomes highlighted, becomes brighter, or undergoes a change to visually signify its selection by the user 2030A. As other examples, an arrow, pointer, text, or other indicia appear in the field of view near the virtual screw 2082A to visually signify its selection by the user 2030A.

Thus, user 2030A is able to use a real object 2080 to perform actions in space on virtual objects 2070A. The real object 2080 and the virtual object 2070A appear as virtual objects to another user 2030B. This user 2030B views the actions from the user 2030A and performs the actions on a real object 2060.

Figure 21:
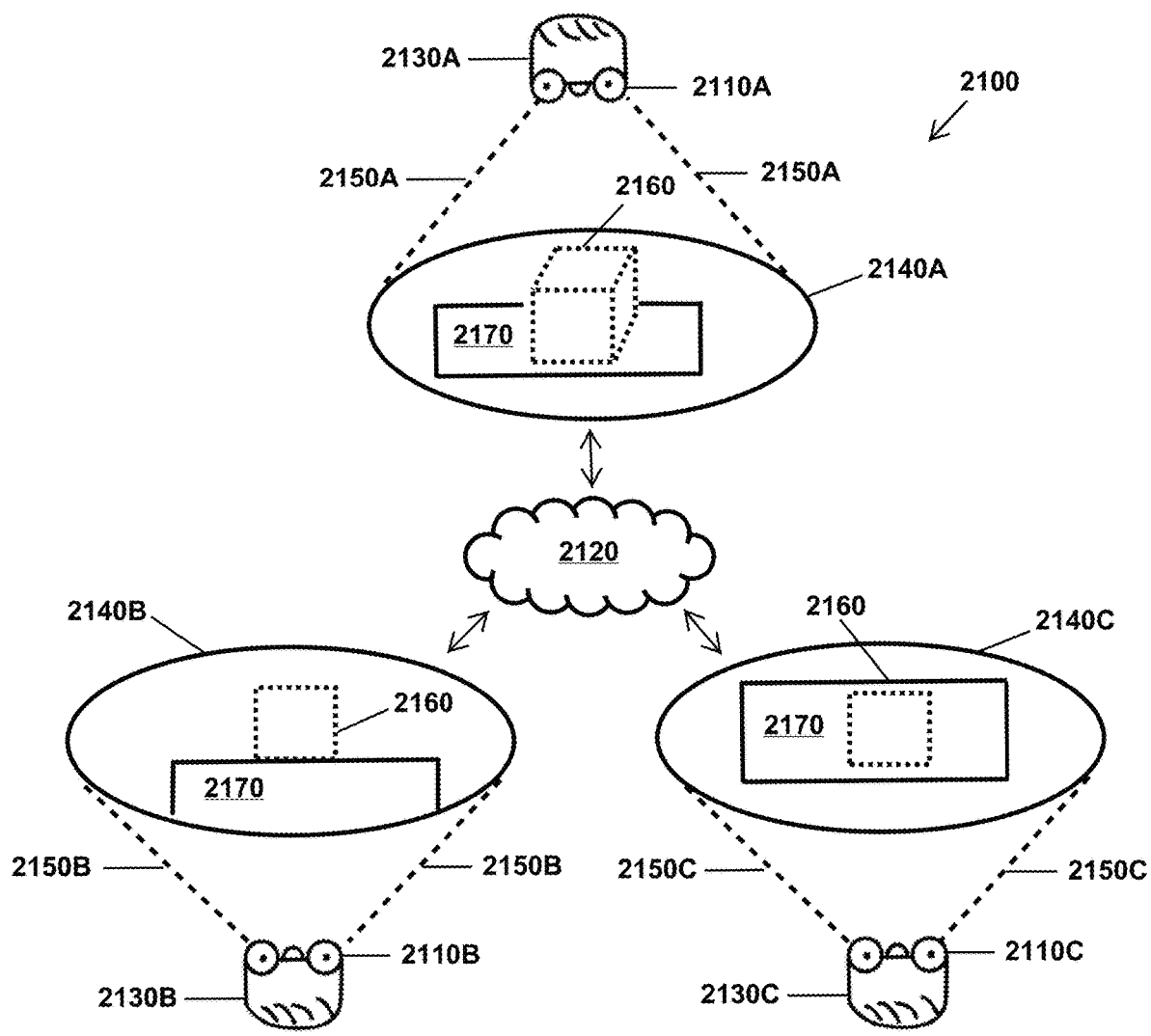
FIG. 21 shows a computer system or electronic device system that includes wearable electronic devices that communicate with each other over a network in accordance with an example embodiment.

FIG. 21 shows a computer system or electronic device system 2100 that includes wearable electronic devices 2110A, 2110B, and 2110C that communicate with each other over a network 2120. For illustration, a user 2130A wears the wearable electronic device 2110A; a user 2130B wears the wearable electronic device 2110B; and a user 2130C wears the wearable electronic device 2110C (these three devices are shown by way of example as electronic glasses or electronic eyewear). Users 2130A, 2130B, and 2130C have respective fields of view 2140A, 2140B, and 2140C with respective peripheries, edges, or perimeters shown with dashed lines 2150A, 2150B, and 2150C.

The fields of view 2140A, 2140B, and 2140C each include a virtual object 2160 seen from a different point of view. User 2130A sees the virtual object 2160 as a 3D virtual box on a real table 2170; user 2130B sees the virtual object 2160 as a one side of the virtual box on the real table 2170; and user 2130C sees the virtual object 2160 as a top of the virtual box on the real table 2070. Each of the users sees the virtual object 2160 from a different location and hence from a different point-of-view. User 2130A sees the virtual box from an elevated point-of-view; user 2130B sees the virtual box from a side point-of-view; and user 2130C sees the virtual box from a top point-of-view.

Consider an example in which the virtual object 2160 is a virtual box that appears to sit on top of real table 2170, and users 2130A, 2130B, and 2130C are situated at different physical locations in a room with the table. A view of the box depends on the physical location of the user with respect to the box. For example, a user situated close to and below the box will have a different point-of-view and hence different view of the box than a user situated above and farther away from the box.

The virtual object appears to the users through their respective wearable electronic devices (such as being displayed on displays or lens of these respective electronic devices). A user without a wearable electronic device would not be able to see the virtual object since it is projected with or displayed on the wearable electronic device.

One or more electronic devices create the virtual object or objects that are presented or displayed to users with the wearable electronic devices. For example, users look through a transparent screen or window to see a 3D virtual object. These electronic devices and/or a computer system include one or more of a gyroscope, an accelerometer, an antenna (such as a WiFi antenna), a motion sensor and/or motion detector, a camera, a projector, a position sensor and/or position tracker, facial recognizer, sensor, lens, and mirror.

In example embodiments, the wearable electronic device can generate, provide, project, or display the virtual object to the user. As one example, the wearable electronic device generates or assists in generating the virtual object. As another example, another electronic device generates the virtual object that is seen through or with the wearable electronic device.

After a virtual object is generated, users can view the virtual object from different viewpoints as if the virtual object were a real object. Users can also interacts with the virtual object, such as adding components to the virtual object, deleting components from the virtual object, scaling portions of the virtual object, changing colors, size, and/or shape of the virtual object, etc. While viewing and/or interacting with the virtual object, users can see each other and interact with the real world.

Figure 22:
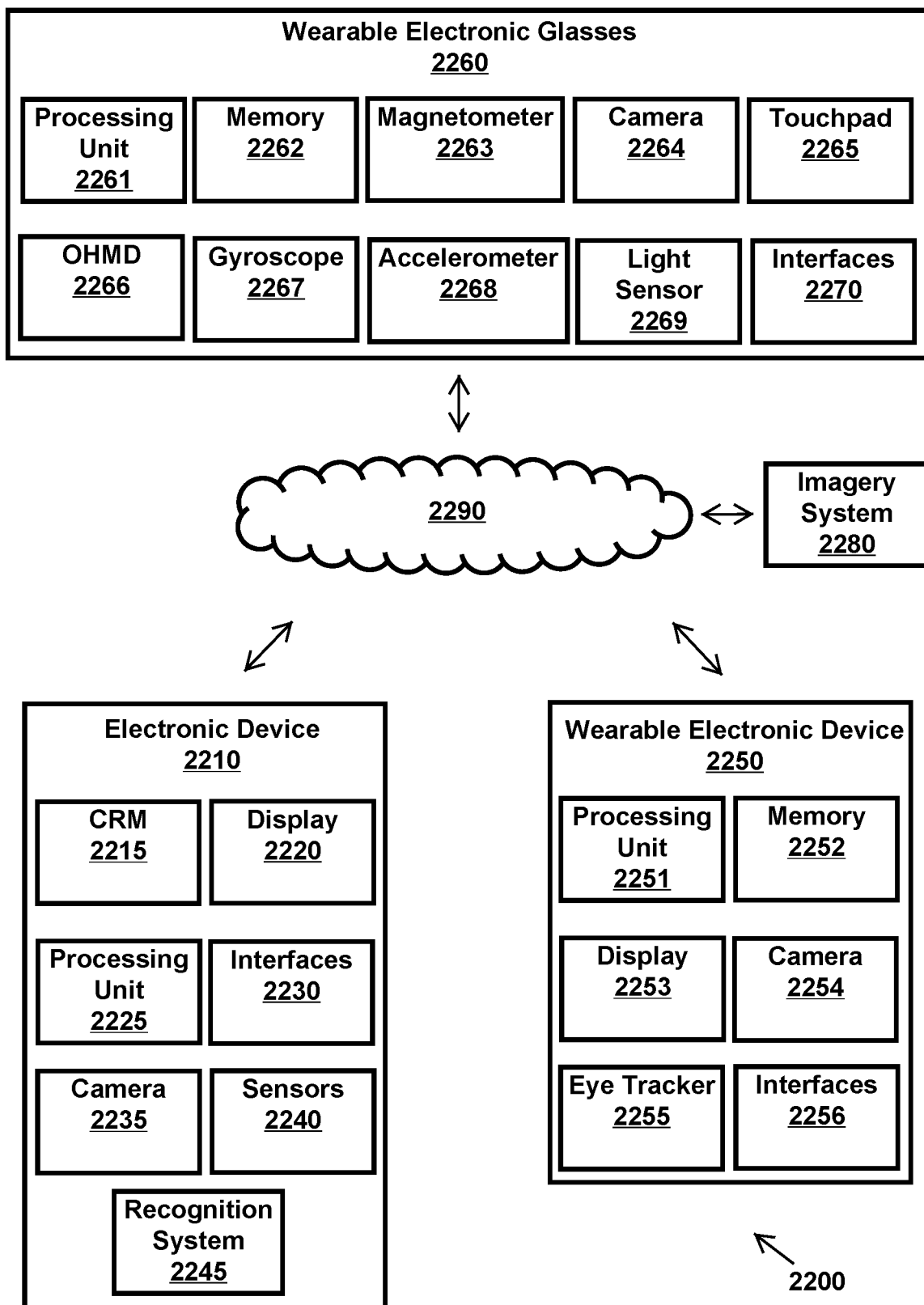
FIG. 22 is a computer system or electronic device system in accordance with an example embodiment.

FIG. 22 is a computer system or electronic device system 2200 in accordance with an example embodiment. The computer system 2200 includes one or more electronic devices 2210 that include components of computer readable medium (CRM) or memory 2215, a display 2220, a processing unit 2225, one or more interfaces 2230 (such as a network interface, a graphical user interface, a natural language user interface, a natural user interface, a reality user interface, a kinetic user interface, an augmented reality user interface, and/or an interface that combines reality and virtuality), a camera 2235, one or more sensors 2240 (such as micro-electro-mechanical systems sensor, an optical sensor, radio-frequency identification sensor, a global positioning satellite sensor, a solid state compass, gyroscope, and/or an accelerometer), and a recognition system 2245 (such as speech recognition system or a gesture recognition system). The sensors can further include motion detectors (such as sensors that detect motion with one or more of infrared, optics, radio frequency energy, sound, vibration, and magnetism).

The computer system 2200 further includes a wearable electronic device 2250 (including a processing unit 2251, a memory 2252, a display 2253, a camera 2254, an eye tracking device or eye tracker 2255, and one or more interfaces 2256).

The computer system 2200 further includes a pair of wearable electronic glasses 2260 (including a processing unit 2261, a memory 2262, a magnetometer 2263, a camera 2264, a touchpad 2265, an optical head mounted display 2266, a gyroscope 2267, an accelerometer 2268, a light sensor 2269, and one or more interfaces 2270), and an imagery system 2280 (such as an optical projection system, a virtual image display system, virtual augmented reality system, and/or a spatial augmented reality system). By way of example, the augmented reality system uses one or more of image registration, computer vision, and/or video tracking to supplement and/or change real objects and/or a view of the physical, real world.

The electronic device 2210, wearable electronic device 2250, wearable electronic glasses 2260, and imagery system 2280 communicate with each other and other electronic devices through one or more networks 2290.

FIG. 22 shows various components in a single electronic device and other components distributed throughout the system. Alternatively, one or more of these components can be distributed or included in various electronic devices, such as some components being included in an HPED, some components being included in a server, some components being included in storage accessible over the Internet, some components being in an imagery system, some components being in wearable electronic devices, and some components being in various different electronic devices that are spread across a network or a cloud, etc.

The processor unit includes a processor (such as a central processing unit, CPU, microprocessor, application-specific integrated circuit (ASIC), etc.) for controlling the overall operation of memory (such as random access memory (RAM) for temporary data storage, read only memory (ROM) for permanent data storage, and firmware). The processing unit communicates with memory and performs operations and tasks that implement one or more blocks of the flow diagrams discussed herein. The memory, for example, stores applications, data, programs, algorithms (including software to implement or assist in implementing example embodiments) and other data.

Blocks and/or methods discussed herein can be executed and/or made by a user, a user agent of a user, a software application, an electronic device, a computer, a computer system, and/or an intelligent personal assistant.

As used herein, "augmented reality" is a view of the real, physical world in which elements are augmented or modified with computer or processor generated input, such as sound, graphics, GPS data, video, and/or images. Virtual images and objects can be overlaid on the real world that becomes interactive with users and digitally manipulative.

As used herein, "field of view" or "field of vision" is the extent of the observable world that is seen at a given moment. For example, without mechanical assistance, humans have almost one hundred and eighty (180) degrees of forward-facing field of view with about one hundred and twenty (120) degrees of this field being binocular vision.

As used herein, a "virtual image" or "virtual object" is computer or processor generated image or object. This image or object often appears to a user in the real, physical world (such as a virtual 3D dimensional object that the user views in the real world).

As used herein, a "wearable electronic device" is a portable electronic device that is worn on or attached to a person. Examples of such devices include, but are not limited to, electronic watches, electronic necklaces, electronic clothing, head-mounted displays, electronic eyeglasses or eye wear (such as glasses in which augmented reality imagery is projected through or reflected off a surface of a lens), electronic contact lenses (such as bionic contact lenses that enable augmented reality imagery), an eyetap, handheld displays that affix to a hand or wrist or arm (such as a handheld display with augmented reality imagery), and HPEDs that attach to or affix to a person.

In some example embodiments, the methods illustrated herein and data and instructions associated therewith are stored in respective storage devices, which are implemented as computer-readable and/or machine-readable storage media, physical or tangible media, and/or non-transitory storage media. These storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; optical media such as Compact Disks (CDs) or Digital Versatile Disks (DVDs). Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to any manufactured single component or multiple components.

Method blocks discussed herein can be automated and executed by a computer, computer system, user agent, and/or electronic device. The term "automated" means controlled operation of an apparatus, system, and/or process using computers and/or mechanical/electrical devices without the necessity of human intervention, observation, effort, and/or decision.

The methods in accordance with example embodiments are provided as examples, and examples from one method should not be construed to limit examples from another method. Further, methods discussed within different figures can be added to or exchanged with methods in other figures. Further yet, specific numerical data values (such as specific quantities, numbers, categories, etc.) or other specific information should be interpreted as illustrative for discussing example embodiments. Such specific information is not provided to limit example embodiments.

What is claimed is:

1. A method comprising:
   tracking, with wearable electronic glasses (WEG) worn on a head of a user, a direction of gaze of the user;
   displaying, on a display of the WEG, three-dimensional (3D) virtual instructions how to operate an electronic device in response to detecting the direction of gaze of the user is at the electronic device that is visible through the display of the WEG; and
   preventing the virtual instructions from moving outside a field of view of the WEG and being no longer visible to the user by moving the virtual instructions from being displayed at one location on the display to being displayed at another location on the display when movement of the WEG will cause the virtual instructions to move outside the field of view.

2. The method of claim 1 further comprising:
   discontinuing the displaying of the 3D virtual instructions how to operate the electronic device in response to detecting the direction of gaze of the user is no longer at the electronic device.

3. The method of claim 1 further comprising:
   playing audio instructions how to operate the electronic device in response to detecting the direction of gaze of the user is at the electronic device; and
   discontinuing the playing of the audio instructions how to operate the electronic device in response to detecting the direction of gaze of the user is no longer at the electronic device, wherein the WEG simultaneously displays the 3D virtual instructions and plays the audio instructions while the direction of gaze of the user is at the electronic device.

4. The method of claim 1 further comprising:
   displaying, on the display of the WEG, the 3D virtual instructions next to the electronic device while the direction of gaze of the user is at the electronic device and the electronic device appears in the field of view of the WEG.

5. The method of claim 1 further comprising:
   setting a playback location that is a physical location where the user must be in order to activate the 3D virtual instructions; and
   activating playing of the 3D virtual instructions when the user arrives at the playback location.

6. The method of claim 1 further comprising:
   sensing, with the WEG, motion of a hand of the user that draws a shape in air around the electronic device; and
   displaying, on a display of second WEG worn on a head of a second user, the shape as a 3D virtual image around the electronic device in response to detecting that a direction of gaze of the second user is at the electronic device.

7. The method of claim 1 further comprising:
   activating, while the direction of gaze of the user is at the electronic device, a message mode that records a voice of the user; and
   playing, with second WEG worn on a head of a second user, the voice of the user that was recorded in response to detecting that a direction of gaze of the second user is at the electronic device.

8. The method of claim 1 further comprising:
   displaying, on the display of the WEG, a 3D virtual electronic device that emulates the electronic device in response to detecting the direction of gaze of the user is at the electronic device; and
   discontinuing the displaying of the 3D virtual electronic device in response to detecting the direction of gaze of the user is no longer at the electronic device.

9. A non-transitory computer readable storage medium storing instructions that cause one or more electronic devices to execute a method comprising:
   tracking, with wearable electronic glasses (WEG) worn on a head of a user, a direction of gaze of the user;
   displaying, on a display of the WEG, three-dimensional (3D) augmented reality (AR) instructions how to operate an electronic device in response to detecting the direction of gaze of the user is at the electronic device that is visible through the display of the WEG; and
   avoiding a collision between the 3D AR instructions and a perimeter of a field of view of the WEG by moving the 3D AR instructions to another location where more space exists in the field of view of the WEG.

10. The non-transitory computer readable storage medium storing instructions of claim 9 in which the method further comprises:
    automatically displaying, on the display of the WEG, a 3D AR object that emulates the electronic device in response to detecting eyes of the user are focused on the electronic device that is visible through the display of the WEG; and
    automatically removing, from the display of the WEG, the 3D AR object that emulates the electronic device in response to detecting the eyes of the user are not focused on the electronic device that is visible through the display of the WEG.

11. The non-transitory computer readable storage medium storing instructions of claim 9 in which the method further comprises:
   automatically displaying, on the display of the WEG and in response to detecting eyes of the user are looking at the electronic device, a 3D virtual assistant that provides instructions to the user on how to operate the electronic device; and
   automatically removing, from the display of the WEG, the 3D virtual assistant in response to detecting the eyes of the user are not looking at the electronic device that is visible through the display of the WEG.

12. The non-transitory computer readable storage medium storing instructions of claim 9 in which the method further comprises:
   determining, by the WEG, a location of the 3D AR instructions; and
   sharing, by the WEG, the location of the 3D AR instructions with a second WEG worn on a head of a second user to enable the second WEG to display the 3D AR instructions at the location.

13. The non-transitory computer readable storage medium storing instructions of claim 9 in which the method further comprises:
   displaying on the display of the WEG, the 3D AR instructions on one side of the electronic device that is visible through the display of the WEG; and
   automatically moving the 3D AR instructions to an opposite side of the electronic device in response to detecting that movement of the WEG will cause the field of view of the WEG to not include the 3D AR instructions.

14. The non-transitory computer readable storage medium storing instructions of claim 9 in which the method further comprises:
   moving the 3D AR instructions closer to the electronic device in response to determining that a distance between the 3D AR instructions and the field of view of the WEG is decreasing.

15. Wearable electronic glasses (WEG), comprising:
   an eye tracker that tracks a direction of gaze of a user wearing the WEG; and
   a display that displays three-dimensional (3D) augmented reality (AR) instructions how to operate an electronic device in response to detecting the direction of gaze of the user is at the electronic device that is visible through the display of the WEG, wherein the display moves a location of the 3D AR instructions from one side of the electronic device that is visible through the display to an opposite side of the electronic device to avoid a collision of the 3D AR instructions with a perimeter of a field of view of the WEG when the WEG moves.

16. The WEG of claim 15 further comprising:
   a sensor that senses hand gestures of hands of the user wearing the WEG, wherein the display displays AR hands that replicate movements of the hand gestures of the hands of the user.

17. The WEG of claim 15, wherein the display simultaneously displays a 3D AR image that emulates the electronic device and the 3D AR instructions as virtual hands that move with respect to the 3D AR image in order to show the user how to operate the electronic device that is visible through the display of the WEG.

18. The WEG of claim 15, wherein the display moves the location of the 3D AR instructions closer to the electronic device that is visible through the display in order to avoid the collision between the 3D AR instructions and the perimeter of the field of view of the WEG.

\* \* \* \* \*